(12) United States Patent
Driesen

(10) Patent No.: US 9,031,910 B2
(45) Date of Patent: May 12, 2015

(54) SYSTEM AND METHOD FOR MAINTAINING A CLUSTER SETUP

(71) Applicant: Volker Driesen, Walldorf (DE)

(72) Inventor: Volker Driesen, Walldorf (DE)

(73) Assignee: SAP SE, Walldorf (DE)

( * ) Notice: Subject to any disclaimer, the term of this patent is extended or adjusted under 35 U.S.C. 154(b) by 177 days.

(21) Appl. No.: 13/925,601

(22) Filed: Jun. 24, 2013

(65) Prior Publication Data

US 2014/0379656 A1    Dec. 25, 2014

(51) Int. Cl.
*G06F 17/00* (2006.01)
*G06F 17/30* (2006.01)

(52) U.S. Cl.
CPC .................. *G06F 17/30356* (2013.01)

(58) Field of Classification Search
None
See application file for complete search history.

(56) References Cited

U.S. PATENT DOCUMENTS

| | | | |
|---|---|---|---|
| 6,324,654 B1 | 11/2001 | Wahl et al. | |
| 6,691,245 B1 | 2/2004 | DeKoning | |
| 6,823,474 B2 | 11/2004 | Kampe et al. | |
| 7,058,731 B2 | 6/2006 | Kodama | |
| 7,155,462 B1 | 12/2006 | Singh et al. | |
| 7,523,142 B2* | 4/2009 | Driesen et al. | 1/1 |
| 8,200,634 B2* | 6/2012 | Driesen et al. | 707/641 |
| 8,335,771 B1* | 12/2012 | Natanzon et al. | 707/684 |
| 2003/0130985 A1* | 7/2003 | Driesen et al. | 707/1 |
| 2003/0131278 A1* | 7/2003 | Fujibayashi | 714/6 |
| 2005/0114291 A1* | 5/2005 | Becker-Szendy et al. | 707/1 |
| 2007/0094467 A1* | 4/2007 | Yamasaki | 711/162 |
| 2008/0046400 A1 | 2/2008 | Shi et al. | |
| 2008/0276234 A1 | 11/2008 | Taylor et al. | |
| 2009/0037367 A1 | 2/2009 | Wein | |
| 2010/0088281 A1* | 4/2010 | Driesen et al. | 707/641 |
| 2011/0161299 A1* | 6/2011 | Prahlad et al. | 707/649 |
| 2012/0303665 A1 | 11/2012 | Engelko et al. | |
| 2013/0185716 A1* | 7/2013 | Yin et al. | 718/1 |
| 2014/0201171 A1* | 7/2014 | Vijayan et al. | 707/692 |

FOREIGN PATENT DOCUMENTS

EP    1091305 A1    4/2001

OTHER PUBLICATIONS

Alto USA (http://www.vmware.com/files/pdf/solutions/san/SAP-Solutions-on-VMWware-Best-Practices-Guide.pdf.
(Continued)

*Primary Examiner* — Hung Le
(74) *Attorney, Agent, or Firm* — Schwegman Lundberg & Woessner, P.A.

(57) ABSTRACT

Methods and systems are directed to a maintenance procedure in a production environment comprising a primary database and a secondary database. Production data may be stored in the primary database and failover data may be stored in the secondary database. Data from the primary database may be replicated to the secondary database. The maintenance procedure may provide for modification of the primary database and the secondary database to conform to one or more modified requirements of a modified version of the application. During the maintenance procedure, data in the databases may be duplicated, data structures may be modified, and modification of certain data elements may be prohibited.

20 Claims, 19 Drawing Sheets

(56) References Cited

OTHER PUBLICATIONS

SAP AG; SAP LT Replication Server; 2012,accessed on Jul. 16, 2014; SAP AG, Walldorf,Germany (http://www.saphana.com/servlet/JiveServlet/previewBody/1811-102-4-3231/SAP LT Replication Server for SAP HANA SPS04 Overview.pdf).

Serge Muts; SAP HANA Operations; Aug. 10, 2011;32;SAP AG,Walldorf,Germany (http://www.sdn.sap.com/irj/sdn/go/portal/prtroot/docs/library/uuid/3081d265).

* cited by examiner

SYSTEM AND METHOD FOR MAINTAINING A CLUSTER SETUP

TECHNICAL FIELD

The subject matter disclosed herein generally relates to the processing of data. Specifically, the present disclosure addresses systems and methods to modify the structure of data in one or more databases.

BACKGROUND

In production systems including a server application and a database, best practices dictate that a second, failover database be in place so that users can continue to use the application even if the first database fails. When an application upgrade requires changes to the database, a third database is brought online during the transition period to allow users of the existing application to continue working while the upgraded application is being deployed.

BRIEF DESCRIPTION OF THE DRAWINGS

Some embodiments are illustrated by way of example and not limitation in the figures of the accompanying drawings.

DETAILED DESCRIPTION

Example methods and systems are directed to modify the structure of data in one or more databases while reducing the downtime presented to one or more applications accessing the data. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. However, it will be evident to one skilled in the art that the present subject matter may be practiced without these specific details.

In some example embodiments, production data is stored in a primary database and failover data is stored in a secondary database. A production application may have access to the primary database via a dispatcher. Data from the primary database may be replicated to the secondary database. In the event of failure of the primary database, the dispatcher may redirect requests from the application to the secondary database. The primary database and the secondary database may be logical partitions within a single physical database, separate databases on a single machine, separate databases on separate machines, or any suitable combination thereof.

Once the maintenance procedure is complete, both the primary database and the secondary database may have been modified to reflect one or more modified requirements of a modified version of the application. The dispatcher may direct requests from the modified version of the application to the secondary database. In the event of failure of the secondary database, the dispatcher may redirect requests from the modified version of the application to the primary database. In other words, in an example embodiment, the roles of the primary database and the secondary database may be reversed after the procedure is complete.

During the maintenance procedure, data in the databases may be duplicated, data structures may be modified, and modification of certain data elements may be prohibited, in accordance with the systems and methods described in more detail below.

Figure 1:
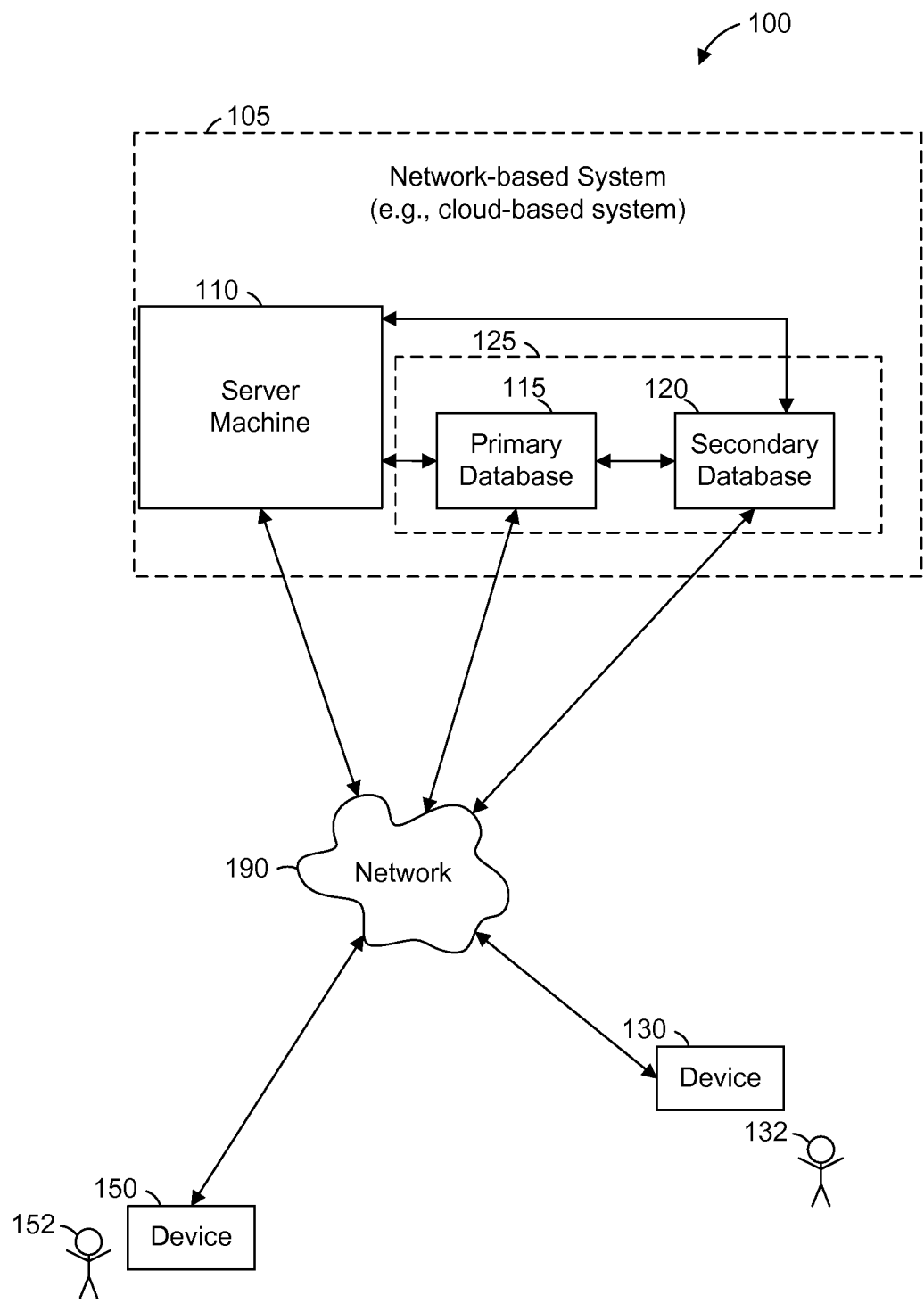
FIG. 1 is a network diagram illustrating a network environment suitable for maintenance in a cluster setup, according to some example embodiments.

FIG. 1 is a network diagram illustrating a network environment suitable for maintenance in a cluster setup, according to some example embodiments. The network environment 100 includes a production system 105, a server machine 110, a database system 125 comprising a primary database 115 and a secondary database 120, and devices 130 and 150, all communicatively coupled to each other via a network 190. The server machine 110 and the devices 130 and 150 may each be implemented in a computer system, in whole or in part, as described below by way of example with respect to FIG. 19.

In some example embodiments, the production system 105 is presented as a black box to the user 132, 152. For example, the user 132, 152 may have only a single point of entry to the production system 105 and may not be able to access each of the server machine 110, the database system 125, the primary database 115, and the secondary database 120 individually. The server machine 110 may provide an interface to the database system 125 and the databases 115-120, using modules as described below with respect to FIG. 2, performing tasks as described below by way of example with respect to FIGS. 10-18. The server machine 110, the primary database 115, and the secondary database 120 may be connected via a separate network, via the network 190, or both.

In some example embodiments, the primary database 115 stores production data for use by the production application. For example, the primary database 115 may store billing invoices, production orders, and bills of materials. Some users may be using the production application and accessing primary database 115 while other users are simultaneously using a modified or upgraded version of the production application and accessing the secondary database 120. Data stored in the primary database 115 may be replicated in the secondary database 120, while data stored in the secondary database 120 may be replicated in the primary database 115.

In some example embodiments, access to the database system 125 is controlled by a dispatcher. Incoming access requests may be directed to a single location (e.g., an IP address, port number, or any suitable combination thereof) and directed by the dispatcher to the primary database 115 or the secondary database 120. The dispatcher may be part of the server machine 110, the primary database 115, the secondary database 120, a separate machine, or any suitable combination thereof.

The device 130 may run an unmodified version of an application while the device 150 is running a modified version of the application. However, a single one of the devices 130 and 150 may run both the unmodified version of the application and the modified version of the application.

Also shown in FIG. 1 are users 132 and 152. One or both of the users 132 and 152 may be a human user, a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 19. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
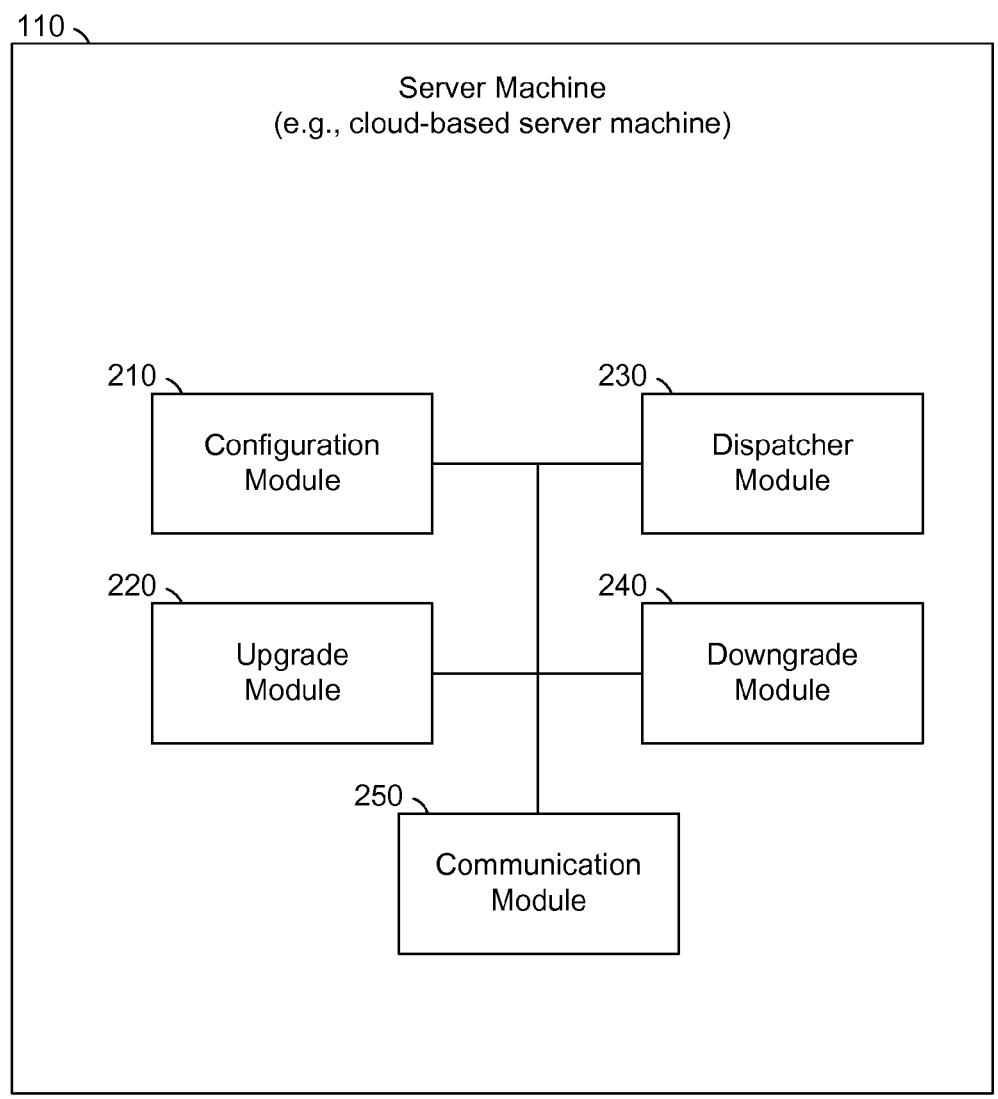
FIG. 2 is a block diagram illustrating components of a server machine suitable for managing maintenance in a cluster setup, according to some example embodiments.

FIG. 2 is a block diagram illustrating components of a server machine suitable for managing maintenance in a cluster setup, according to some example embodiments. The server machine 110 is shown as including a configuration module 210, an upgrade module 220, a dispatcher module 230, a downgrade module 240, and a communication module 250, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The configuration module 210 may configure the database system 125 to operate in a number of modes, as further discussed below. The configuration module 210 may also configure the dispatcher module 230 to direct incoming requests from one or more applications, as further discussed below.

For example, the database system 125 may be configured to operate in an initial mode that processes application requests in one database (e.g., the primary database 115) and replicates the results of those requests in the other database (e.g., the secondary database 120).

The database system 125 may also be configured to operate in a transitional mode that processes application requests from one version of an application in one database (e.g., the primary database 115) and replicates the results of those requests in a temporary area in the other database (e.g., shadow data in the secondary database 120). The transitional mode may further process requests from a modified version of the application in the other database (e.g., the secondary database 120) and replicate the results of those requests in a temporary area in the first database (e.g., shadow data in the primary database 115).

The database system 125 may be further configured to operate in a restricted mode that processes application requests from one version of the application in one database (e.g., the primary database 115) without replicating the results of those requests. In some example embodiments, the results of the unreplicated results may be stored in tracked data, and the tracked data may later be replicated in the other database (e.g., the secondary database 120, the shadow data in the secondary database 120, or both).

The database system 125 may be further configured to operate in a maintenance mode that processes some application requests from one version of the application in one database (e.g., the primary database 115) and replicates the results of the requests in the other database (e.g., the secondary database 120, the shadow data in the secondary database 120, or both) while rejecting some application requests from the version of the application. In some example embodiments, the decision to reject an application request is based on a difference in the structure of data stored in the two databases 115, 120. For example, if user data is stored in a User table in the primary database 115 and the User table in the primary database 115 contains only the user name and the user ID while a modified version of the User table in the secondary database 120 contains the user name, the user ID, and the user's address, the dispatcher module 230 may be configured by the configuration module 210 to reject requests that modify the User table.

The database system 125 may be further configured to operate in a final mode that processes requests from a modified version of the application in one database (e.g., the secondary database 120) and replicates the results of the requests in the other database (e.g., the primary database 115). In some example embodiments, no temporary data stores (e.g., shadow data in the primary database 115, shadow data in the secondary database 120, or both) are used in this mode. In some example embodiments, requests from the unmodified version of the application are rejected in this mode.

The upgrade module 220 may be configured to modify the primary database 115 or the secondary database 120 for an upgrade or modification of the application. In some example embodiments, the upgrade module 220 creates secondary shadow data in the secondary database 120 by copying the replicated data within the secondary database 120. In some example embodiments, the upgrade module 220 modifies the secondary database 120 to conform to a modified requirement of a modified version of the application. For example, the upgrade module 220 may copy an unmodified User table to the shadow data, then modify the User table in the secondary database 120 to contain an additional column, in conformance with a modified requirement of the modified version of the application. In some example embodiments, the upgrade module 220 creates shadow data in the primary database 115 that also conforms to the modified requirement of the modified version of the application. When the primary database 115 and the shadow data of the secondary database 120 both conform to the unmodified requirement of the unmodified application, data created by the unmodified application may be replicated from the primary database 115 to the shadow data of the secondary database 120, or vice versa. When the secondary database 120 and the shadow data of the primary database 115 both conform to the modified requirement of the modified application, data created by the modified application may be replicated from the secondary database 120 to the shadow data of the primary database 115, or vice versa.

The upgrade module 220 may be further configured to modify the primary database 115 to conform to the modified requirement of the modified version of the application. For example, the upgrade module 220 may modify the User table to contain an additional column, in conformance with a modified requirement of a modified version of the application. When the primary database 115 and the secondary database 120 both conform to the modified requirement of the modified application, data created by the modified application may be replicated from the secondary database 120 to the primary database 115, or vice versa.

The dispatcher module 230 may be configured to dispatch requests originating from the application or the modified version of the application to the primary database 115 or the secondary database 120. As discussed above with respect to the configuration module 210, the dispatch of requests depends on the current configuration of the database system 125. In some example embodiments, the dispatcher module 230 recognizes whether the request originates from the application or the modified version of the application and determines whether to send the request to the primary database 115 or the secondary database 120 based on the origin of the request.

The downgrade module 240 may be configured to reverse the steps taken by the upgrade module 220, as described above. The downgrade module 240 may be invoked when the decision to deploy the modified version of the application is reversed.

The communication module 250 may communicate with the application, the modified version of the application, or both. For example, the communication module 250 may send and receive data packets containing requests. A request may include an indicator that indicates the origin of the packet and a query that indicates the data being requested or provided. For example, a packet may indicate that it originates at the application or a modified version of the application. As another example, the query may indicate a set of records (e.g., all records in a table, all records regarding an individual, all records written in the last week, or any suitable combination thereof) or a specific record (e.g., invoice number 5, user "John Doe").

The communication module 250 may respond to data requests with records from the primary database 115, the secondary database 120, or both. The communication module 250 may perform additional operations, including those described below.

Figure 3:
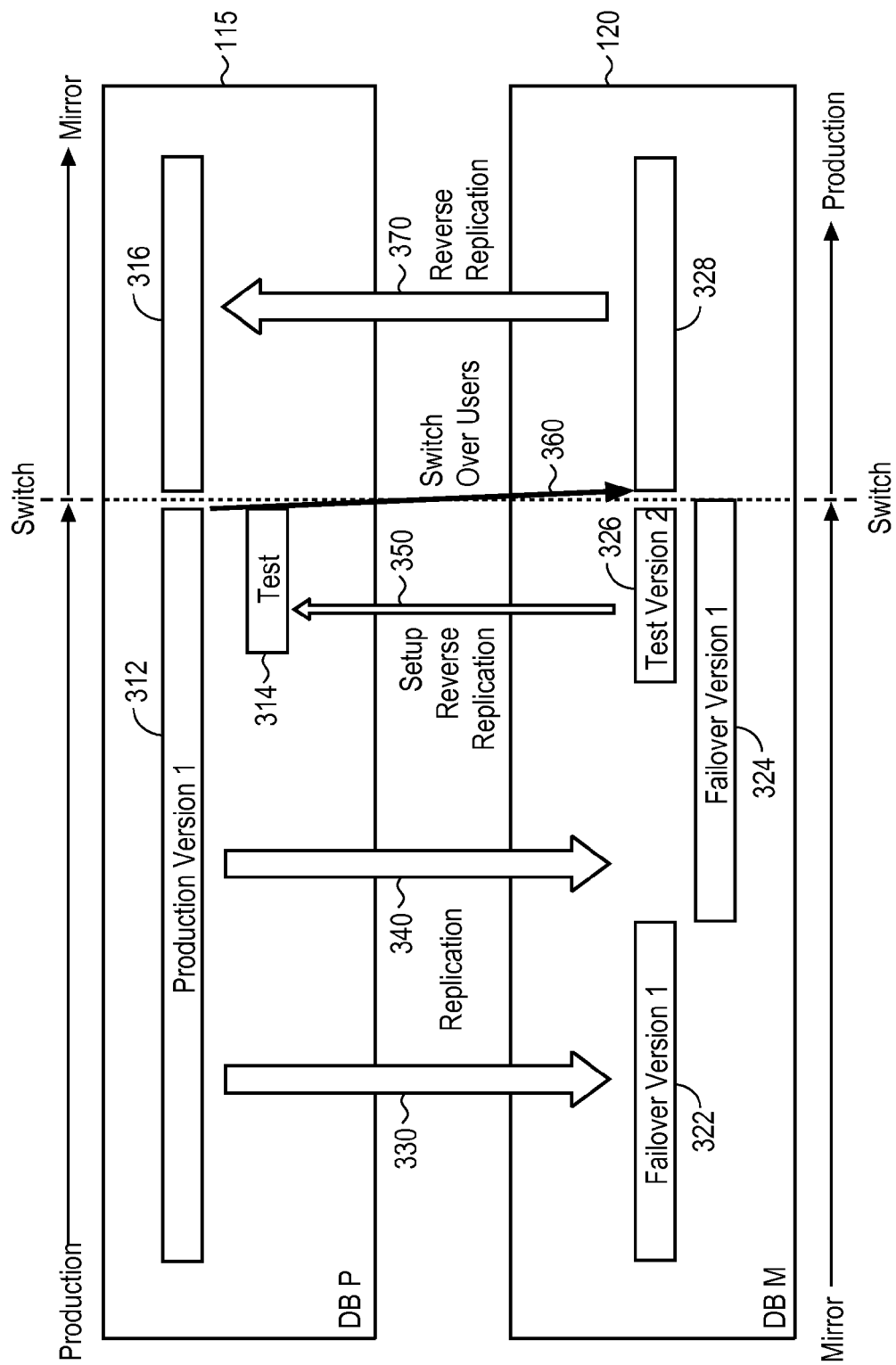
FIGS. 3-4 are timelines illustrating sequences of events in a primary database and a secondary database during maintenance in a cluster setup, according to some example embodiments.

FIG. 3 is a timeline illustrating sequences of events in a primary database and a secondary database during maintenance in a cluster setup, according to some example embodiments. FIG. 3 includes the primary database 115, the secondary database 120, data conforming to one or more requirements of the unmodified application 312, 322, and 324, data conforming to one or more modified requirements of the modified application 314, 316, 326, and 328, replication indicators 330, 340, 350, and 370, and user switchover indicator 360. FIG. 3 also indicates which of the two databases 115 and 120 is, at any given time, the production database and which is the mirror database (also referred to as the backup database or the failover database).

At the beginning of the process as seen in FIG. 3, the primary database 115 is the production database and contains data 312 conforming to the requirements of version 1 of the application (e.g., conforming to the unmodified requirements of the unmodified version of the application). Likewise, the secondary database 120 is the mirror database and also contains data 322 conforming to the requirements of version 1 of the application. As indicated by indicator 330, data in the primary database 115 is replicated in the secondary database 120.

In the next step of the process, data 324 has been created in the secondary database 120, conforming to the requirements of version 1 of the application. Indicator 340 shows that replication is now proceeding from data 312 in the primary database 115 to data 324 in the secondary database 120.

In the next step of the process, data 314 has been created in the primary database 115 and data 326 has been created in the secondary database 120. Both data 314 and data 326 conform to the requirements of version 2 of the application (e.g., conform to the modified requirements of the modified version of the application). Indicator 350 shows that replication is now proceeding from data 326 in the secondary database 120 to data 314 in the primary database 115. Replication is continuing from data 312 in the primary database 115 to data 324 in secondary mirror database 120.

In the next step of the process, indicator 360 shows that users are switched over from accessing the primary database 115 to accessing the secondary database 120. Test data 314 in the primary database 115 has been upgraded in status to failover data 316. Likewise, test data 326 in the secondary database has been upgraded in status to production data 328. Indicator 370 shows that the direction of replication has now been reversed and is proceeding from production data 328 in the secondary database 120 to data 316 in the primary database 115. Data 312 and data 324, conforming to version 1 of the application, are no longer in use and are not shown after the switchover 360. In some example embodiments, all users are switched over simultaneously. In other example embodiments, users are switched over on a rolling basis. The criteria for switching over on a rolling basis may include the completion of tasks, user priority, or both. For example, a user may begin an operation in version 1 of the application and then be switched to version 2 of the application as soon as the operation is complete. In some example embodiments, the user has a limited period of time to complete the version 1 operation. For example, the rolling switchover may begin at a certain time, at which users are switched over if they are not currently in an operation or when the current operation is complete. After a set amount of time has elapsed (e.g., 30 minutes), any pending version 1 operations may be canceled and any remaining version 1 users upgraded to version 2.

Figure 4:
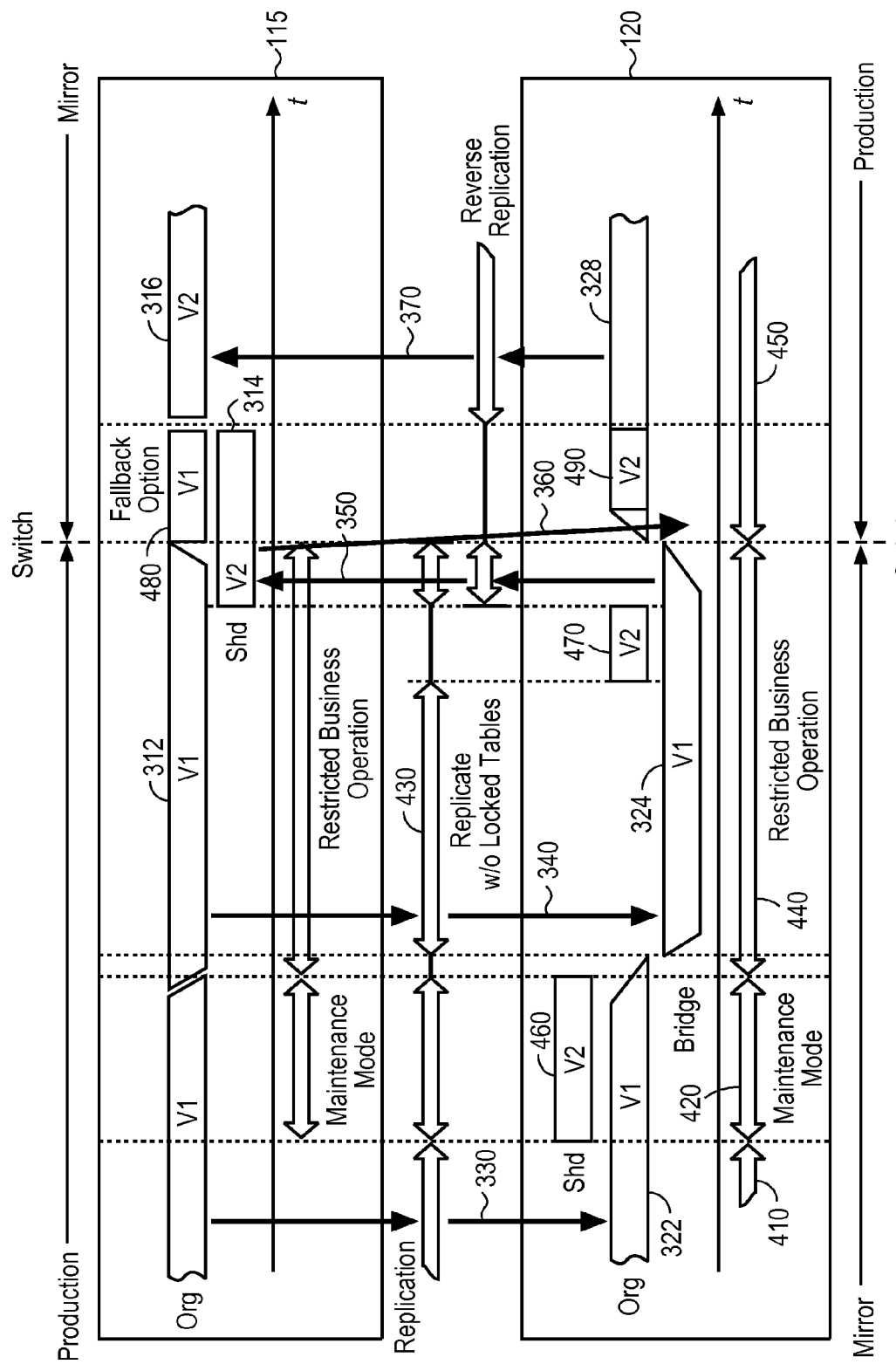

FIG. 4 is a timeline illustrating sequences of events in a primary database 115 and a secondary database 120 during maintenance in a cluster setup, according to some example embodiments. FIG. 4 includes the primary database 115, the secondary database 120, data 312, 322, 324, and 480 conforming to one or more requirements of the unmodified application, data 314, 316, 328, 460, 470, and 490 conforming to one or more modified requirements of the modified application, replication indicators 330, 340, 350, and 370, switchover indicator 360, and database mode indicators 410, 420, 430, 440, and 450. FIG. 4 also indicates which of the two databases 115 and 120 is, at any given time, the production database and which is the mirror (or backup) database.

At the beginning of the process as seen in FIG. 4, the primary database 115 is the production database, and contains data 312 conforming to the requirements of version 1 of the application (e.g., conforming to the unmodified requirements of the unmodified version of the application). Likewise, the secondary database 120 is the mirror database, and also contains data 322 conforming to the requirements of version 1 of the application. As indicated by indicator 330, data in the primary database 115 is replicated in the secondary database 120. Furthermore, database mode indicator 410 shows that the database system 125 is operating in an initial mode, in which all requests from the version 1 of the application can be processed.

In the next step of the process, data 460 is being created in the secondary database 120, conforming to the requirements of version 2 of the application. Database mode indicator 420 shows that the database system 125 is now in maintenance mode, and the lack of a replication indicator shows that no replication is taking place.

Thereafter, database mode indicator 440 shows that the database system 125 is placed in a restricted business operation mode. In some example embodiments, in this mode, users of the application are prevented from modifying data stored in structures that have changed between version 1 and version 2 of the application. Referring to the example used earlier, version 2 of the application may use an additional field (e.g. an address) for a type of data (e.g. user records). Indicators 430 and 340 show that replication is then restored generally, but excluding the types of data that cannot be modified in the restricted business operation mode. In some example embodiments, any allowed changes that were made while replication was disabled are propagated to the secondary database 120 once replication is restored. At this point in FIG. 4, data 324 has been created in the secondary database 120 as a bridge structure, conforming to the requirements of version 1 of the application. Indicator 340 shows that replication is now proceeding from data 312 in the primary database 115 to data 324 in the secondary database 120.

In the next step of the process, shadow data 314 has been created in the primary database 115 and data 460 in the secondary database 120 has been promoted from shadow data to the main data 470 of the secondary database 120. Both data 314 and data 470 conform to the requirements of version 2 of the application (e.g., conform to the modified requirements of the modified version of the application). Indicator 350 shows that replication is now proceeding from data 470 in the secondary database 120 to shadow data 314 in the primary database 115. Replication is continuing from data 312 in the primary database 115 to data 324 in secondary mirror database 120. During this period, version 2 of the application may be tested in the secondary database 120 in a read-only mode.

In the next step of the process, data 480 has been created in the primary database 115, conforming to the requirements of version 1 of the application. In some example embodiments, if the transition to version 2 of the application should fail (e.g., be rejected by users, be unstable, or both), data 480 can be used to support version 1 of the application. Meanwhile, users are switched over from accessing the primary database 115 to accessing data 490 in the secondary database 120. Replication is disabled, but users have full access as the database system 125 is restored to normal, version 2 operation, as shown by database mode indicator 450. During this period, version 2 of the application may be tested in the secondary database 120 in a full-access (e.g., read-write) mode.

In the last step shown in FIG. 4, test data 314 in the primary database has been upgraded in status to failover data 316. Likewise, test data 490 in the secondary database 120 has been upgraded in status to production data 328. Replication indicator 370 shows that the direction of replication has now been reversed, and is proceeding from data 328 in the secondary database 120 to data 316 in the primary database 115. Data 312 and data 324, conforming to version 1 of the application, are no longer in use, and are not shown after the switchover 360. Database mode indicator 450 shows that users have full access to the database system 125.

Figure 5:
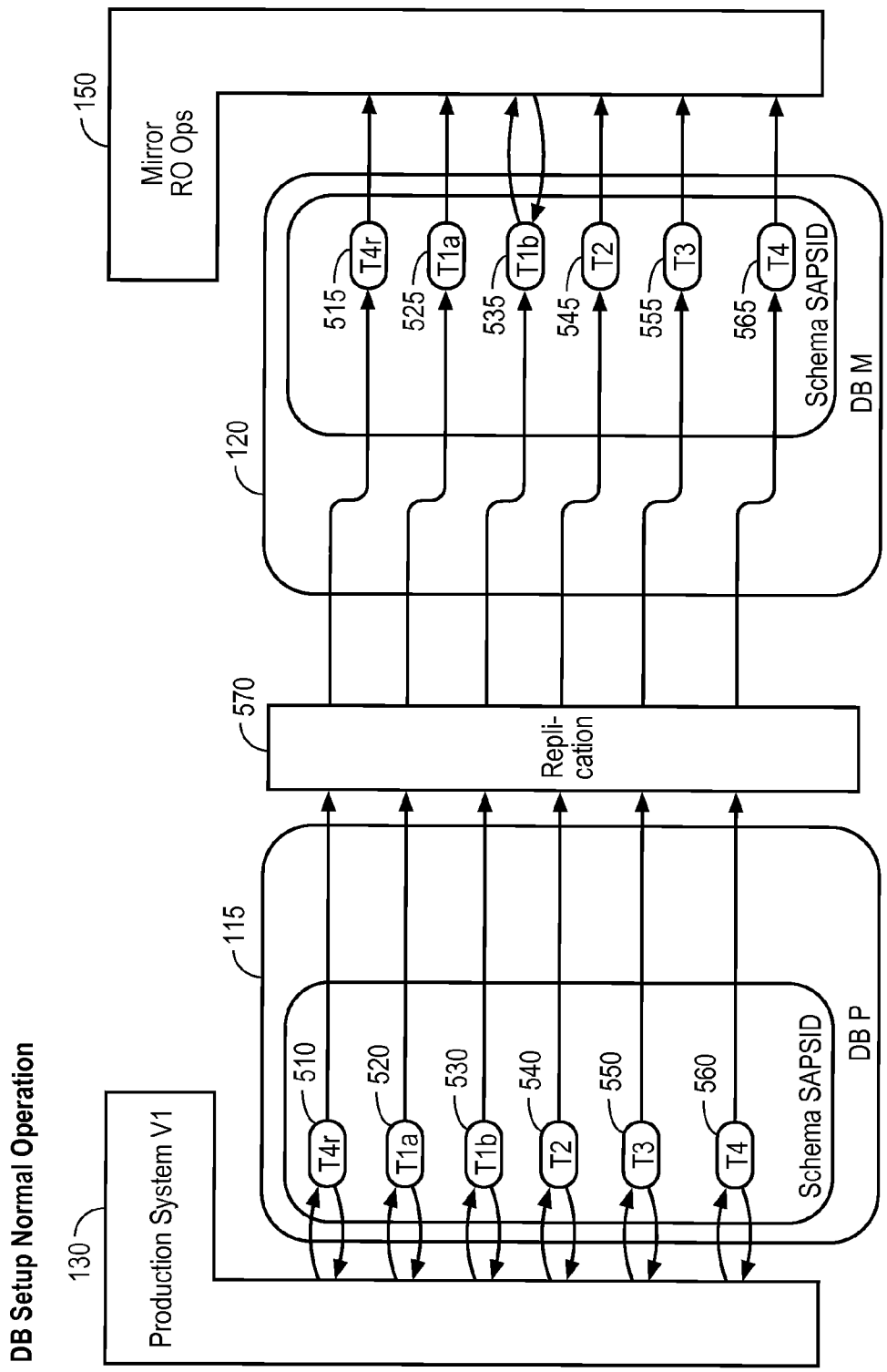
FIGS. 5-9 illustrate example structures of data in a primary database and a secondary database at different points in time during maintenance in a cluster setup.

FIG. 5 illustrates example structures of data in a primary database and a secondary database at a point in time during maintenance in a cluster setup. Shown in FIG. 5 are device 130 using version 1 of the application and accessing the primary database 115, device 150 performing read-only operations by accessing the secondary database 120, data 510, 520, 530, 540, 550, and 560 stored in the primary database 115, and data 515, 525, 535, 545, 555, and 565 stored in the secondary database 120. As shown, replication 570 is proceeding from the primary database 115 to the secondary database 120.

In this initial state, all data 510, 520, 530, 540, 550, and 560 can be both read and written by the version 1 application. Each of these is being replicated in the corresponding data 515, 525, 535, 545, 555, and 565, as shown by the arrows. Data 535, labeled "T1b" is shown as being modifiable even by the otherwise read-only access from device 150. In some example embodiments, it may be desirable to log accesses by users. In these embodiments, allowing pure read-only access would prevent the logging of accesses by read-only users. Accordingly, the T1b data 535 may log the accesses by the read-only users. Since the data 535 also replicates the T1b data 530 from the primary database 115 without reverse replication, the T1b data 535 will accordingly contain records on all accesses while the T1b data 530 will not contain records on accesses through the secondary database 120.

Figure 6:
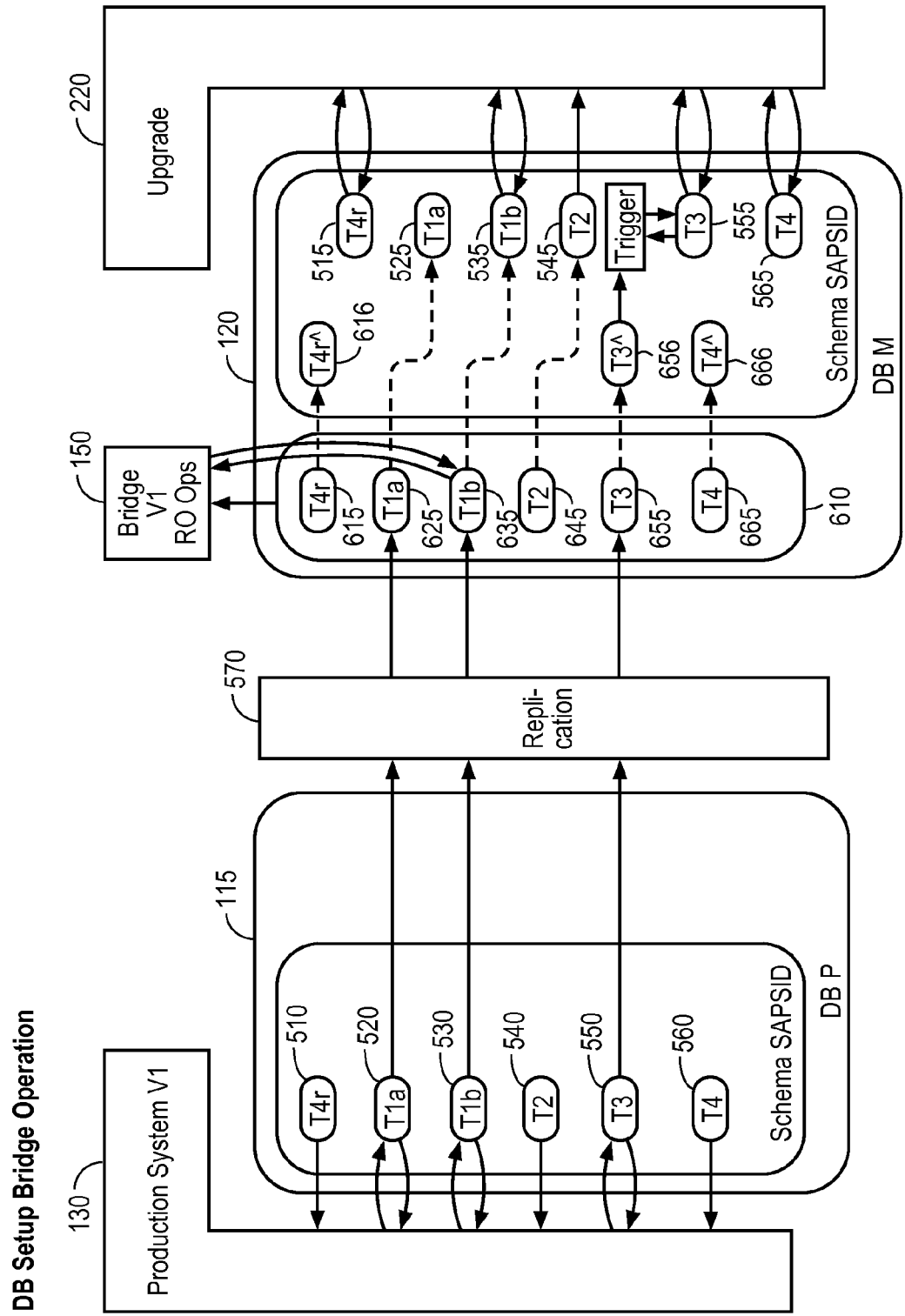

FIG. 6 illustrates example structures of data in a primary database and a secondary database at a point in time during maintenance in a cluster setup. Shown in FIG. 6 are device 130 using version 1 of the application and accessing the primary database 115, device 150 performing read-only operations by accessing the secondary database 120, upgrade module 220 accessing the secondary database 120 to perform the necessary modifications, data 510, 520, 530, 540, 550, and 560 stored in the primary database 115, data 515, 616, 525, 535, 545, 555, 656, 565, and 666 stored in the secondary database 120, and data 615, 625, 635, 645, 655, and 665 stored in the shadow data 610 of the secondary database 120. As shown, replication 570 is proceeding from the primary database 115 to the secondary database 120.

Each of the categories of data T4r, T1a, T1b, T2, T3, and T4 indicated by reference numerals 510, 520, 530, 540, 550, and 560 in the primary database 115 may be handled differently during this stage.

Device 150 continues with its version 1 read-only operation, but now accesses the shadow data 610 instead of the secondary database 120. The shadow data 610 may comprise data 615, 625, 635, 645, 655, and 665, each of which may be an alias to data 616, 525, 635, 545, 656, and 666, respectively, as shown by the dotted lines. In this context, an alias provides a different identifier for data, but the data accessed is the same whether accessed by the alias or the original identifier. For example, if a new record is added to T1a data 525, the new record is also immediately available for access via T1a data 625, without need to duplicate the record.

T4r data 510 is data whose structure will be modified to comply with one or more requirements of the modified version of the application. T4r data 510 becomes read-only for the unmodified version of the application and replication of T4r data 510 to T4r data 515 in the secondary database 120 ceases. Backup copy T4r^ 616 is created in the secondary database 120, containing data conforming to the requirements of version 1 of the application. Version 1 T4r data 615, in the shadow data 610, is available for read-only access by the device 150. Upgrade module 220 modifies the replicated T4r data 515 to conform to the requirements of version 2 of the application.

T1a data 520 is application data (e.g., invoices, purchase orders, inventory, or any suitable combination thereof) whose structure will not be modified during the transition. T1a data 525 is available from the shadow data 610 as T1a data 625. As the structure of this data will not be modified during the transition, the upgrade module 220 is shown neither reading from nor writing to the T1a data 525.

As discussed earlier with respect to FIG. 5, T1b data 530 may log database accesses. Database accesses by the upgrade module 220 may be tracked by updating T1b data 535. Device 150 may access T1b data 635, which may be an alias for T1b data 535, as shown by the dotted arrow.

T2 data 540 is data that will be accessed by the upgrade module 220 during the upgrade process. T2 data 540 may be configuration data for the upgrade process itself. For example, T2 data 540 may contain a start time for the upgrade, a maximum amount of computing resources (e.g., CPU cycles, memory usage, database modifications per second, or any suitable combination thereof) to be used by the upgrade, instructions for the modification to be performed during the upgrade, or any suitable combination thereof. To avoid instability produced by changing parameters for the upgrade once the upgrade has begun, T2 data 540, 545, and 645 may be read-only. To save resources, no replication between them may be required, as no modification of T2 data 540, 545, and 645 is occurring in read-only mode. Upgrade module 220 may access T2 data 545 to access the parameters stored therein, while device 150 may access T2 data 645. T2 data 645 may be an alias for T2 data 545, as shown by the dotted arrow.

T3 data 550 is customizing data. T3 data 555 is copied in the secondary database 120 as T3^ data 656. T3 data 555, accessible to the upgrade module 220, may have a different structure than T3^ data 656. In this case, a trigger may be set up to allow modifications of the T3^ data 656, indirectly caused by modifications of the T3 data 550 by the version 1 application, to propagate to the T3 data 555. Device 150 may access T3 data 655, which may be an alias for T3^ data 656, as shown by the dotted arrow.

T4 data 560 becomes read-only for the unmodified version of the application and replication of T4 data 560 to T4 data 565 in the secondary database 120 ceases. Upgrade module 220 modifies a copy of T4 data 565 to conform with the requirements of version 2 of the application. Backup copy T4^ 666 is created in the secondary database 120, containing data conforming to the requirements of version 1 of the application. Replicated version 1 T4 data 665 remains available for read-only access by the user device 150 and may be an alias for T4^ data 666, as shown by the dotted arrow.

Figure 7:
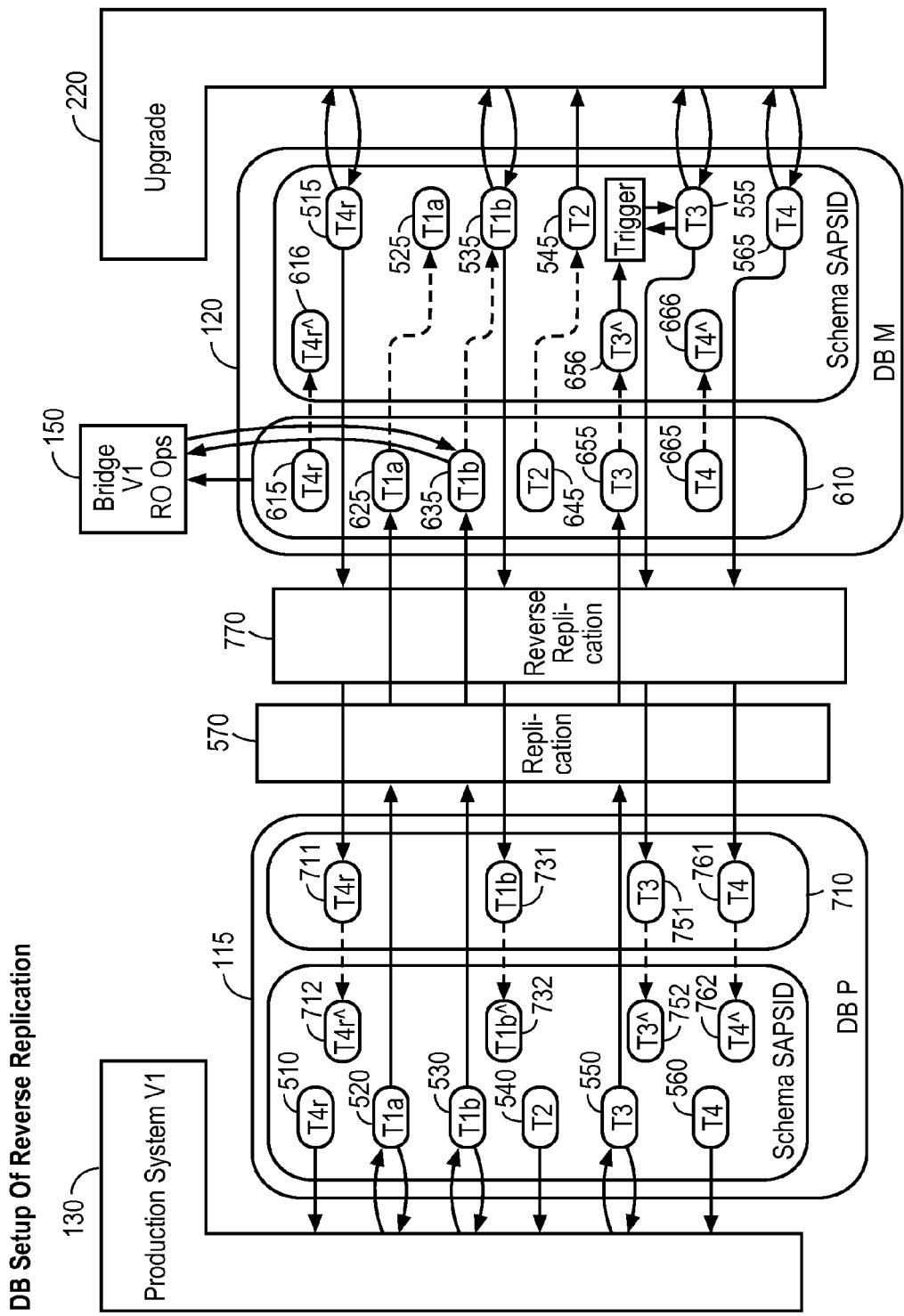

FIG. 7 illustrates example structures of data in a primary database and a secondary database at a point in time during maintenance in a cluster setup. Shown in FIG. 7 are device 130 using version 1 of the application and accessing the primary database 115, device 150 performing read-only operations by accessing the secondary database 120, upgrade module 220 accessing the secondary database 120 to perform the necessary modifications, data 510, 520, 530, 540, 550, 560, 712, 732, 752, and 762 stored in the primary database 115, data 515, 616, 525, 535, 545, 555, 656, 565, and 666 stored in the secondary database 120, data 711, 731, 751, and 761 stored in the shadow data 710 of the primary database 115, and data 615, 625, 635, 645, 655, and 665, stored in the shadow data 610 of the secondary database 120. As shown, replication 570 is proceeding from the primary database 115 to the shadow data 610 of the secondary database 120. Also shown is partial reverse replication 770 proceeding from the version 2 data 515, 535, 555, and 565 in the secondary database 120 to the data 711, 731, 751, and 761 in the primary shadow data 710.

In FIG. 7, the relationship between elements 130, 150, 220, 510, 520, 530, 540, 550, 560, 570, 515, 525, 535, 545, 555, 565, 610, 615, 616, 625, 635, 645, 655, 656, 665, and 666 remains the same as for FIG. 6, described above.

As shown in FIG. 7, reverse replication 770 has begun to replicate version 2 data 515, 535, 555, and 565 from the secondary database 120 to the shadow data 710. Copies of version 2 data T4r^ 712, T1b^ 732, T3^ 752, and T4^ 762 have been placed in the primary database 115. T4r data 711, T1b data 731, T3 data 751, and T4 data 761 in the shadow data 710 may be aliases for the corresponding tables in the primary database 115, as indicated by the dotted arrows.

Figure 8:
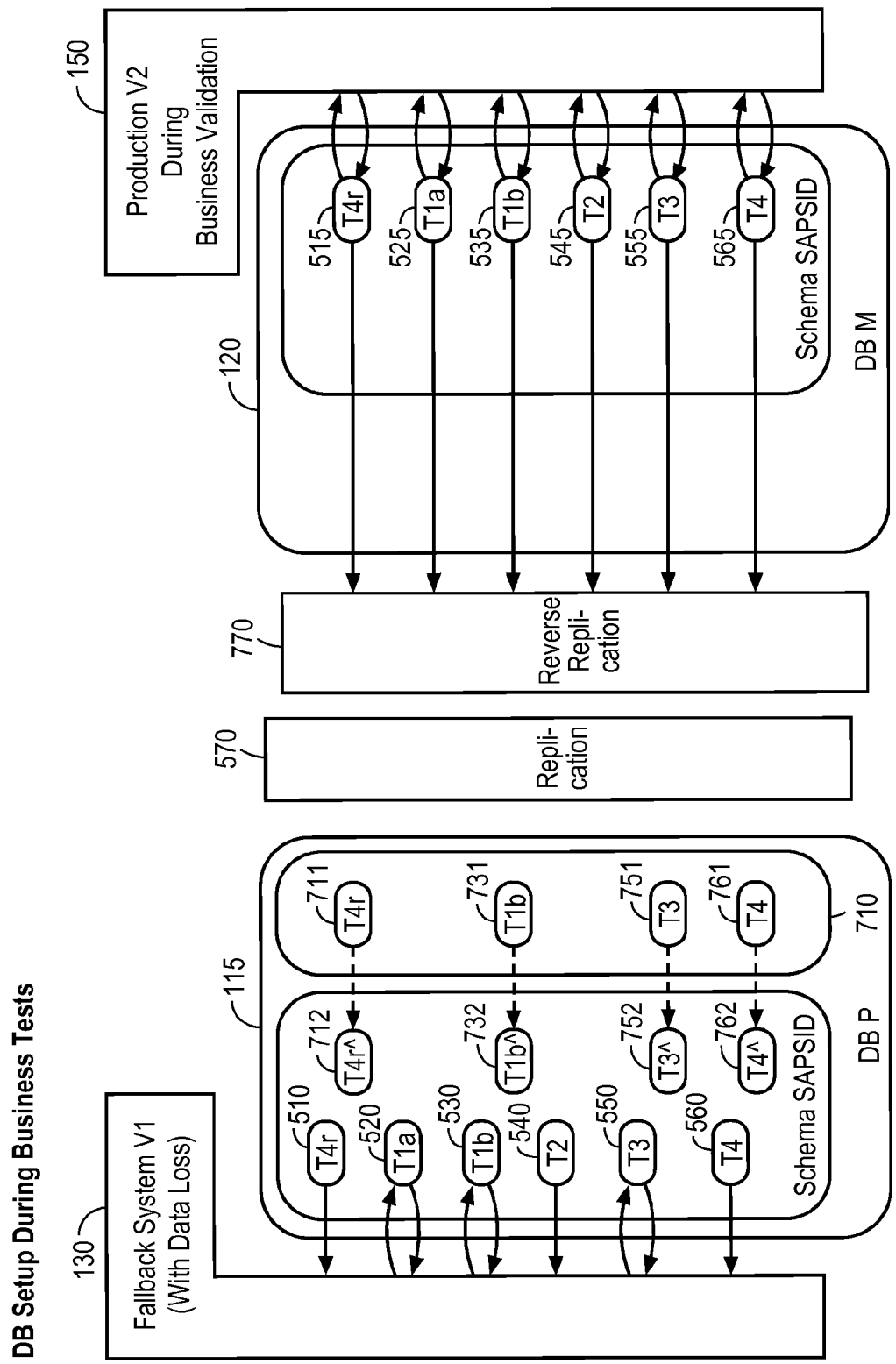

FIG. 8 illustrates example structures of data in a primary database and a secondary database at a point in time during maintenance in a cluster setup. Shown in FIG. 8 are device 130 using version 1 of the application and accessing the primary database 115, device 150 using version 2 of the application and accessing the secondary database 120, data 510, 520, 530, 540, 550, 560, 712, 732, 752, and 762 stored in the primary database 115, data 711, 731, 751, and 761 stored in the shadow data 710 of the primary database 115, and data 515, 525, 535, 545, 555, and 565 stored in the secondary database 120. As shown, replication 570 and reverse replication 770 have both ceased.

In FIG. 8, device 130 continues to have access to version 1 of the application in the primary database 115. However, as replication 570 has been disabled and the transition to version 2 is imminent, any changes made at this point by device 130 may be lost. Data 711-762 in FIG. 8 have the same relationships with the system as described with respect to FIG. 7 above.

At this point in the process, data 515, 525, 535, 545, 555, and 565 in the secondary database 120 have been fully upgraded to comply with the requirements of version 2 of the application. Device 150 may access the upgraded secondary database 120 for testing or deployment of the version 2 application. Meanwhile, database 115 remains compliant with the requirements of the version 1 application. Thus, if during this testing of the version 2 application it is found to be undesirable to complete the deployment of version 2, the primary database 115 remains available to process version 1 requests.

Figure 9:
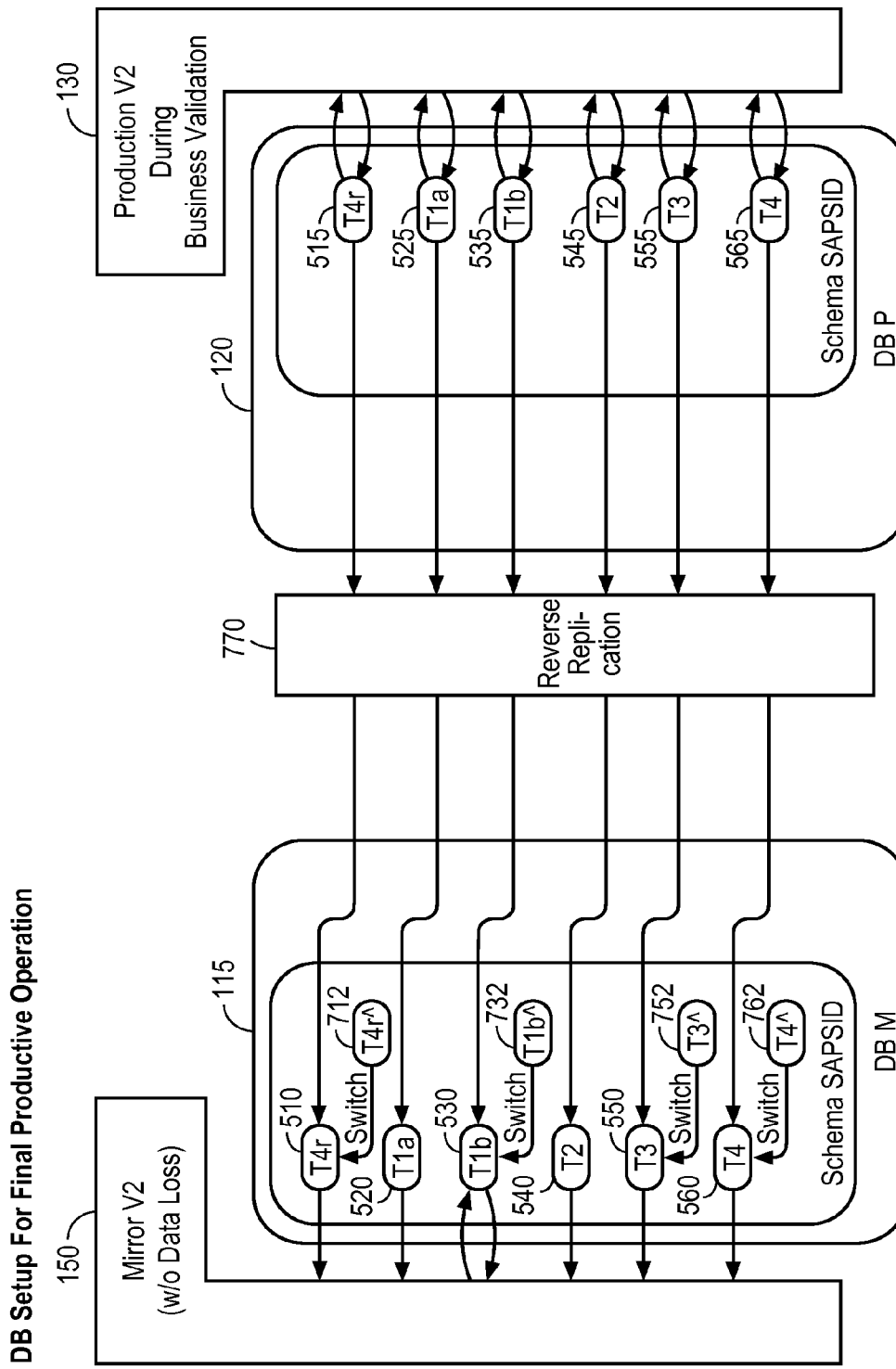

FIG. 9 illustrates example structures of data in a primary database and a secondary database at a point in time during maintenance in a cluster setup. Shown in FIG. 9 are device 130 using version 2 of the application and accessing the secondary database 120, device 150 using version 2 of the application and accessing, in a read-only mode, the primary database 115, data 510, 712, 520, 530, 732, 540, 550, 752, 560, and 762 stored in the primary database 115, and data 515, 525, 535, 545, 555, and 565 stored in the secondary database 120. As shown, reverse replication 770 replicates data from the secondary database 120 to the primary database 115.

In FIG. 9, version 2-compliant T4r^ data 712, T1b^ data 732, T3^ data 752, and T4^ data 762 is switched with version 1-compliant T4r data 510, T1b data 530, T3 data 550, and T4 data 560. After the switch, the data interfaces presented by the primary database 115 are version 2-compliant.

In FIG. 9, device 130 now has read-write access to all types of data in the version 2 secondary database 120. Likewise, device 150 now has read-only access to data in the version 2 primary database 115. As in the first step, T1b data 530 can be modified by the otherwise read-only access of the device 150. This may be desirable, e.g., to log data accesses.

FIGS. 10-18 are flow diagrams illustrating operations of a device in performing a method of maintenance in a cluster setup, according to some example embodiments. The methods 1000 and 1800 may, for example, be performed by the server machine 110 of FIG. 1, using modules described above with respect to FIG. 2, in configuring the primary database 115 and the secondary database 120.

Figure 10:
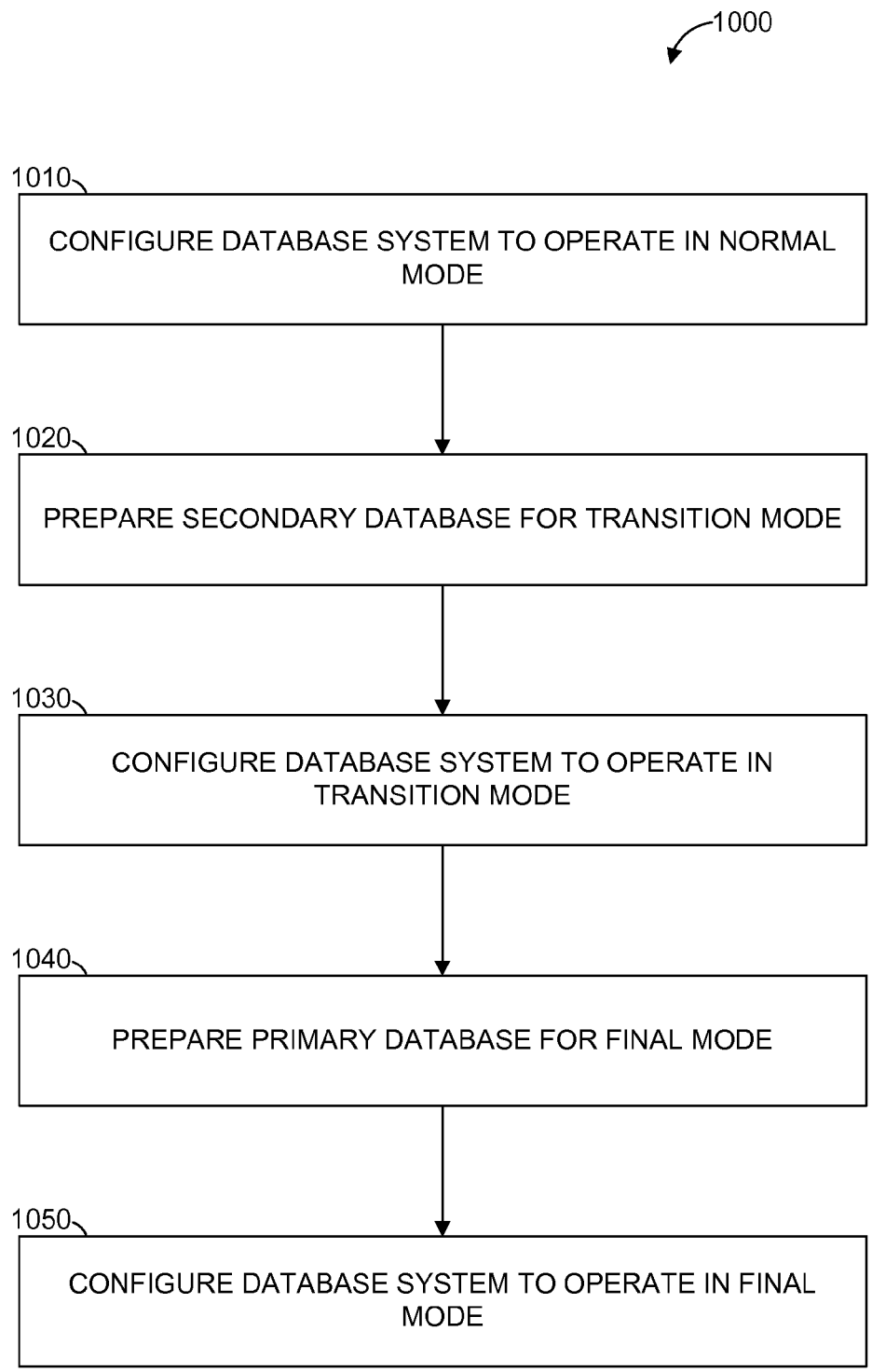
FIGS. 10-18 are flow diagrams illustrating operations of a device in performing a method of maintenance in a cluster setup, according to some example embodiments.

As shown in FIG. 10, the method 1000 includes operations 1010, 1020, 1030, 1040, and 1050. In various embodiments, more or fewer operations may be used.

In operation 1010, the configuration module 210 configures the database system 125 to operate in an initial mode. In this mode, the unmodified version of the application can be accessed via the primary database 115, and data is replicated to the secondary database 120. Data in both the primary database 115 and the secondary database 120 conforms to the requirements of the unmodified version of the application (e.g., conforms with at least one unmodified requirement of an unmodified version of the application).

In operation 1020, the upgrade module 220 prepares the secondary database 120 to operate in a transitional mode. This may include creating shadow data in the secondary database 120 that conforms with the requirements of the unmodified version of the application. This may be done by copying the replicated data in the secondary database 120 into a shadow area of the secondary database 120. Preparing the secondary database 120 to operate in a transitional mode may also include modifying the structure of the data to conform with the requirements of the modified version of the application (e.g., conforms with at least one modified requirement of a modified version of the application).

In operation 1030, the configuration module 210 configures the database system 125 to operate in a transitional mode. In this mode, the unmodified version of the application can access the primary database 115 and data is replicated to the shadow data in the secondary database 120. Meanwhile, the modified version of the application can access the secondary database 120, though data may not be replicated.

In operation 1040, the upgrade module 220 prepares the primary database 115 to operate in a final mode. This may include modifying the structure of data in the primary database 115 to conform with the requirements of the modified version of the application.

In operation 1050, the configuration module 210 configures the database system 125 to operate in the final mode. In this mode, the modified version of the application can access the secondary database 120 and data may be replicated into the primary database 115.

Figure 11:
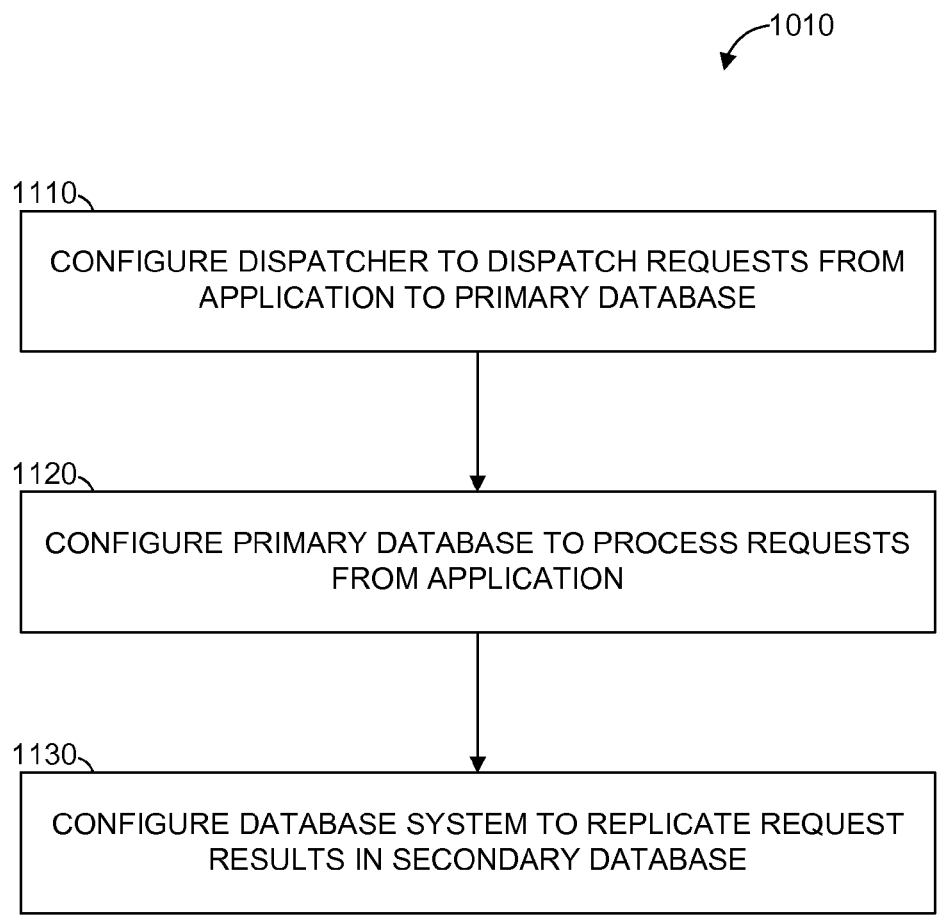

FIG. 11 is a flowchart showing additional detail that may be implemented in operation 1010 and includes operations 1110, 1120, and 1130. In various embodiments, more or fewer operations may be used.

In operation 1110, the configuration module 210 configures the dispatcher module 230 to dispatch requests from the unmodified application to the primary database 115.

Thereafter, as shown in operation 1120, the configuration module 210 configures the database system 125 to process requests from the unmodified application in the primary database 115.

In operation 1130, the configuration module 210 configures the database system 125 to replicate the results of requests received from the unmodified application from the primary database 115 to the secondary database 120.

Figure 12:
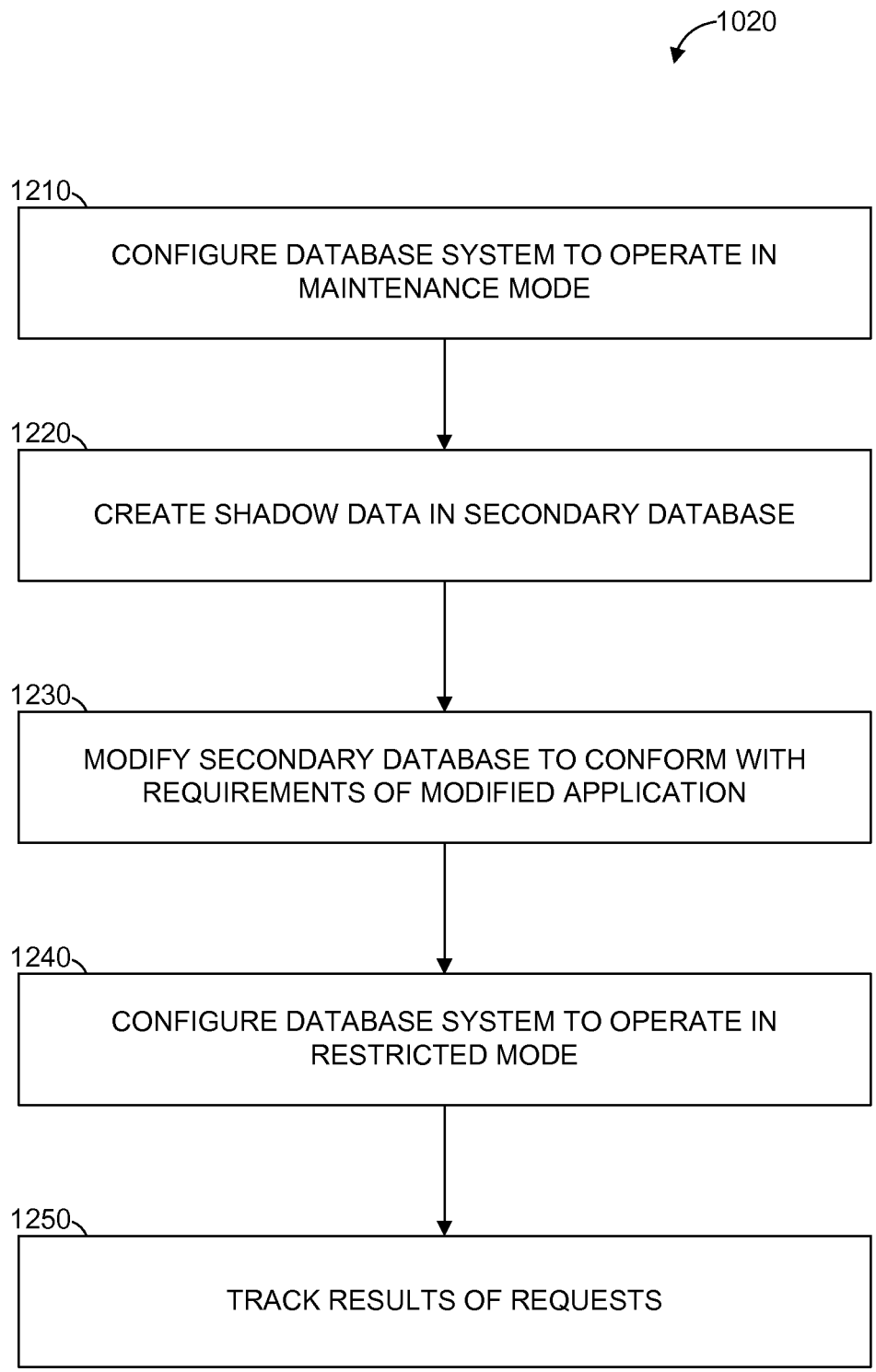

FIG. 12 is a flowchart showing additional detail that may be implemented in operation 1020 and includes operations 1210, 1220, 1230, 1240, and 1250. In various embodiments, more or fewer operations may be used.

In operation 1210, the configuration module 210 configures the database system 125 to operate in a maintenance mode. In this mode, the database system 125 processes some application requests from one version of the application in one database (e.g., the primary database 115) and replicates the results of the requests in the other database (e.g., the secondary database 120, the shadow data in the secondary database 120, or both), while rejecting some application requests from the version of the application. In some example embodiments, the decision to reject an application request is based on a difference in the structure of data stored in the two databases 115,120. For example, if user data is stored in a User table in the primary database 115 and the User table in the primary database 115 contains only the user name and the user ID while a modified version of the User table in the secondary database 120 contains the user name, the user ID, and the user's address, the dispatcher module 230 may be configured by the configuration module 210 to reject requests that modify the User table.

In operation 1220, the upgrade module 220 creates shadow data in the secondary database 120. This may be done by copying the replicated data in the secondary database 120 into a shadow area of the secondary database 120.

In operation 1230, the upgrade module 220 modifies the structure of the data in the secondary database 120 to conform with the requirements of the modified version of the application.

In operation 1240, the configuration module 210 configures the database system 125 to operate in a restricted mode. In this mode, the database system 125 processes application requests from one version of the application in one database (e.g., the primary database 115) without replicating the results of those requests.

In operation 1250, the configuration module 210 configures the database system 125 to store the unreplicated results in tracked data. In some example embodiments, the tracked data may later be replicated in the other database (e.g., the secondary database 120, the shadow data in the secondary database 120, or both).

Figure 13:
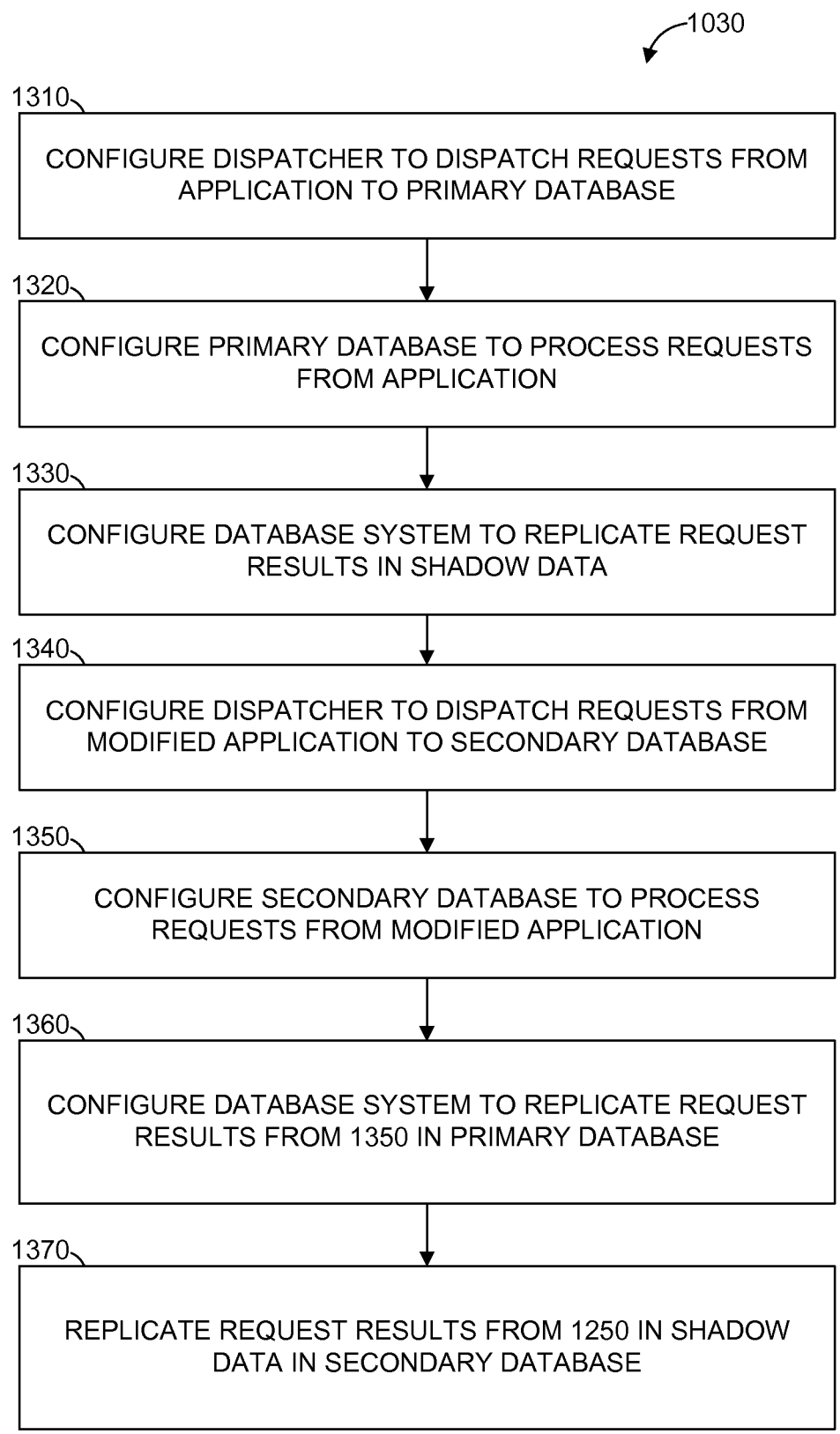

FIG. 13 is a flowchart showing additional detail that may be implemented in operation 1030 and includes operations 1310, 1320, 1330, 1340, 1350, 1360, and 1370. In various embodiments, more or fewer operations may be used.

In operation 1310, the configuration module 210 configures the dispatcher module 230 to dispatch requests from the unmodified version of the application to the primary database 115.

In operation 1320, the configuration module 210 configures the database system 125 to process requests from the unmodified version of the application in the primary database 115.

In operation 1330, the configuration module 210 configures the database system 125 to replicate the results of requests received from the unmodified application from the primary database 115 to the secondary database 120.

In operation 1340, the configuration module 210 configures the dispatcher module 230 to dispatch requests from the modified version of the application to the secondary database 120.

In operation 1350, the configuration module 210 configures the database system 125 to process requests from the modified version of the application in the secondary database 120.

In operation 1360, the configuration module 210 configures the database system 125 to replicate results from the modified version of the application in the shadow area of the primary database 115.

In operation 1370, the upgrade module 220 copies the tracked data that was generated while the database system 125 was operating in the maintenance mode to the shadow area of the secondary database 120. In some example embodiments, this may prevent data from being lost during the maintenance mode.

Figure 14:
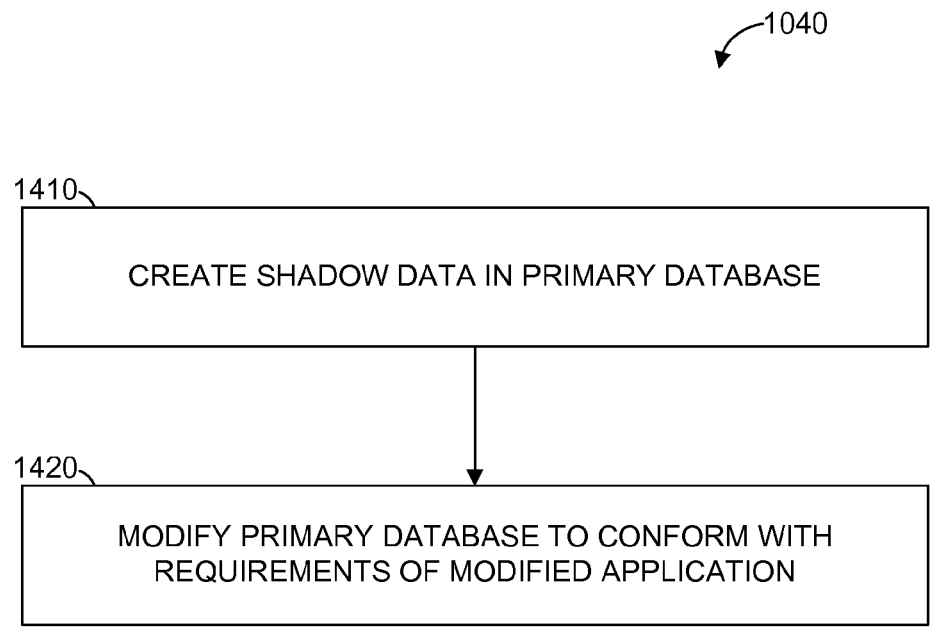

FIG. 14 is a flowchart showing additional detail that may be implemented in operation 1040 and includes operations 1410 and 1420. In various embodiments, more or fewer operations may be used.

In operation 1410, the upgrade module 220 creates shadow data in the primary database 115. This shadow data may conform with the requirements of the modified version of the application.

In operation 1420, the upgrade module 220 modifies the structure of the data in the primary database 115 to conform with the requirements of the modified version of the application.

Figure 15:
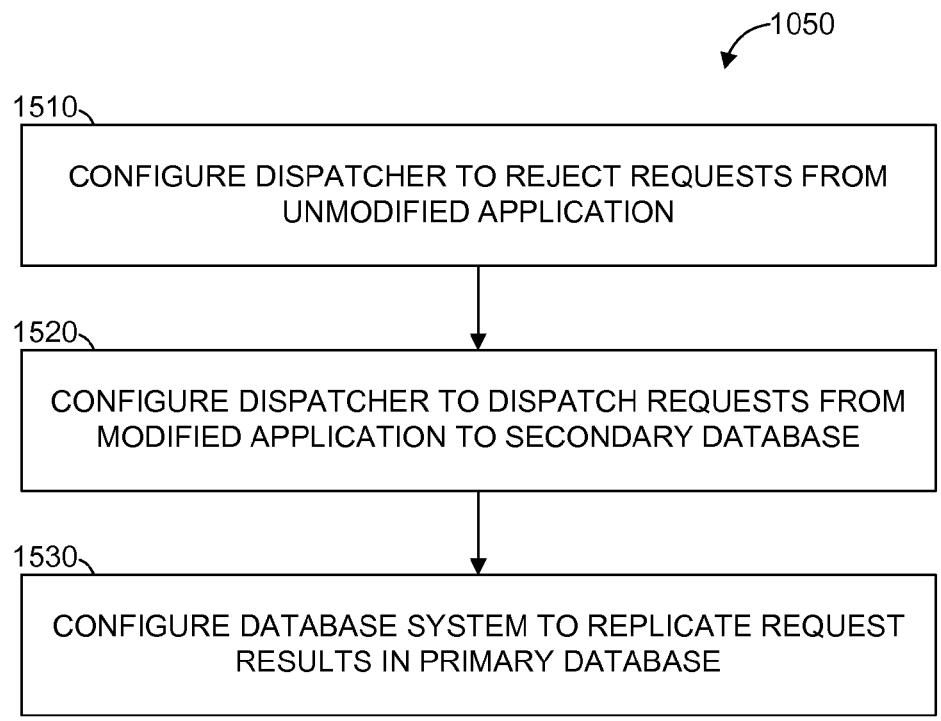

FIG. 15 is a flowchart showing additional detail that may be implemented in operation 1050 and includes operations 1510, 1520, and 1530. In various embodiments, more or fewer operations may be used.

In operation 1510, the configuration module 210 configures the dispatcher module 230 to reject requests from the unmodified version of the application.

In operation 1520, the configuration module 210 configures the dispatcher module 230 to dispatch requests from the modified version of the application to the secondary database 120.

In operation 1530, the configuration module 210 configures the database system 125 to replicate request results from the secondary database 120 to the primary database 115.

Figure 16:
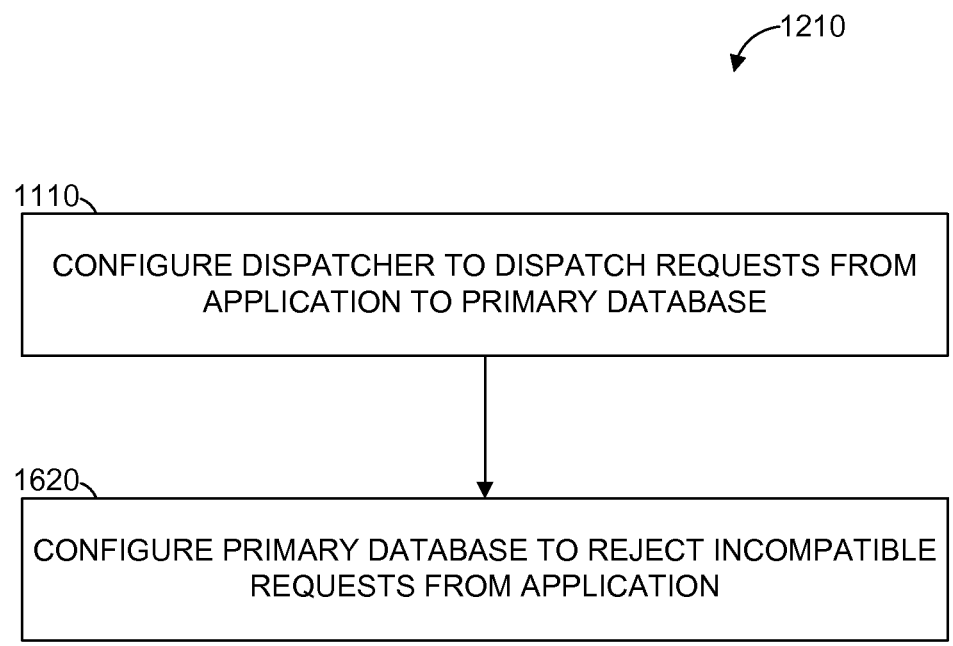

FIG. 16 is a flowchart showing additional detail that may be implemented in operation 1210 and includes operations 1110 and 1620. In various embodiments, more or fewer operations may be used.

Operation 1110 is described above, with respect to FIG. 11.

In operation 1620, the configuration module 210 configures the primary database 115 to reject requests from the unmodified version of the application that are incompatible with the modified version of the application. For example, if the structure of the User table has been modified in the secondary database 120 to conform with one or more requirements of the modified version of the application, the primary database 115 may reject requests from the unmodified version of the application that seek to change data stored in the unmodified User table in the primary database 115.

Figure 17:
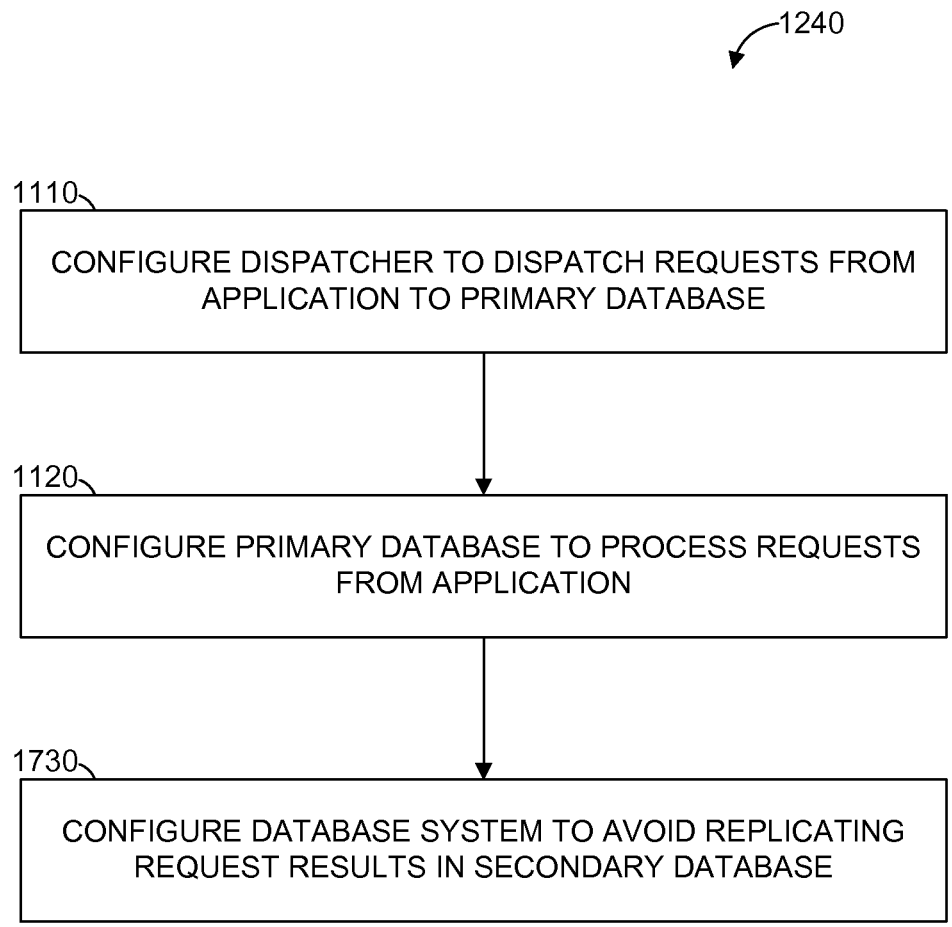

FIG. 17 is a flowchart showing additional detail that may be implemented in operation 1240 and includes operations 1110, 1120, and 1730. In various embodiments, more or fewer operations may be used.

Operations 1110 and 1120 are described above, with respect to FIG. 11.

In operation 1730, the configuration module 210 configures the database system 125 to halt the replication of results from the primary database 115 to the secondary database 120.

Figure 18:
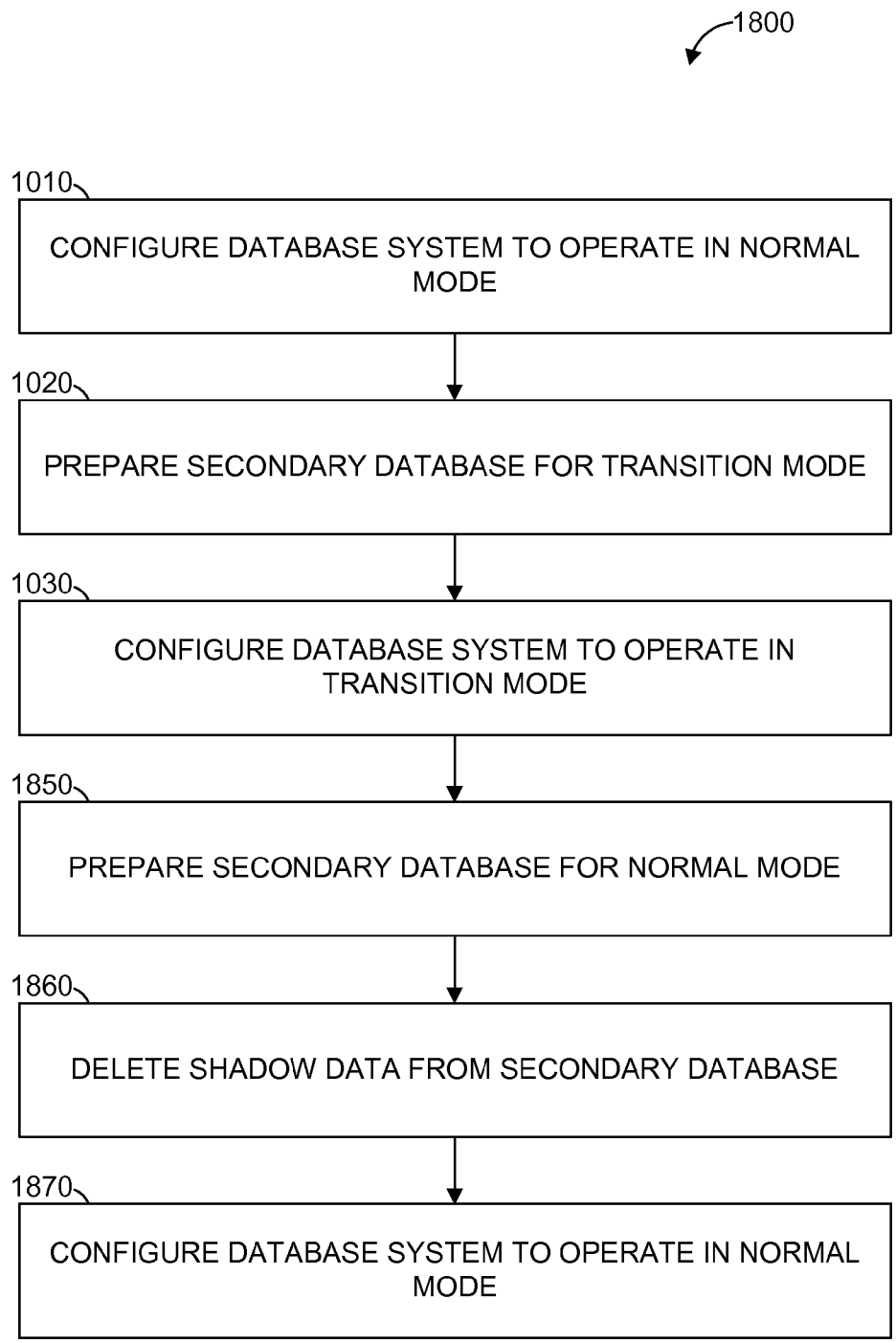

As shown in FIG. 18, the method 1800 includes operations 1010, 1020, 1030, 1850, 1860, and 1870. The method 1800 may be used to begin an upgrade procedure and roll it back without loss of data. In various embodiments, more or fewer operations may be used.

Operations 1010, 1020, and 1030 are described above with respect to FIGS. 10-17.

In operation 1860, the downgrade module 240 deletes the shadow data from the secondary database 120 that was created during operation 1020.

In operation 1870, the configuration module 210 configures the database system 125 to resume operation in the initial mode, as described for operation 1010.

According to various example embodiments, one or more of the methodologies described herein may facilitate controlling access to two or more databases by two or more applications. Moreover, one or more of the methodologies described herein may facilitate upgrading a database system to conform to one or more requirements of an upgraded software application with minimal disruption to users. Furthermore, one or more of the methodologies described herein may facilitate providing the upgrade with minimal exposure to risk of data loss. One or more of the methodologies described herein may facilitate providing the upgrade with an increased ability to terminate the upgrade without affecting users or losing data. Additionally, one or more of the methodologies described herein may facilitate providing the upgrade with minimal downtime (e.g., may reduce the amount of time that neither the original application nor the upgraded application is available to end-users).

When these effects are considered in aggregate, one or more of the methodologies described herein may obviate a need for certain efforts or resources that otherwise would be involved in modifying a database system to conform to modified requirements of a modified application. Efforts expended by a user or administrator in upgrading an application, or by an end user in continuing to get work done while an upgrade is taking place, may be reduced by one or more of the methodologies described herein. Computing resources used by one or more machines, databases, or devices (e.g., within the network environment 100) may, similarly, be reduced. Examples of such computing resources include processor cycles, network traffic, memory usage, data storage capacity, power consumption, and cooling capacity.

Figure 19:
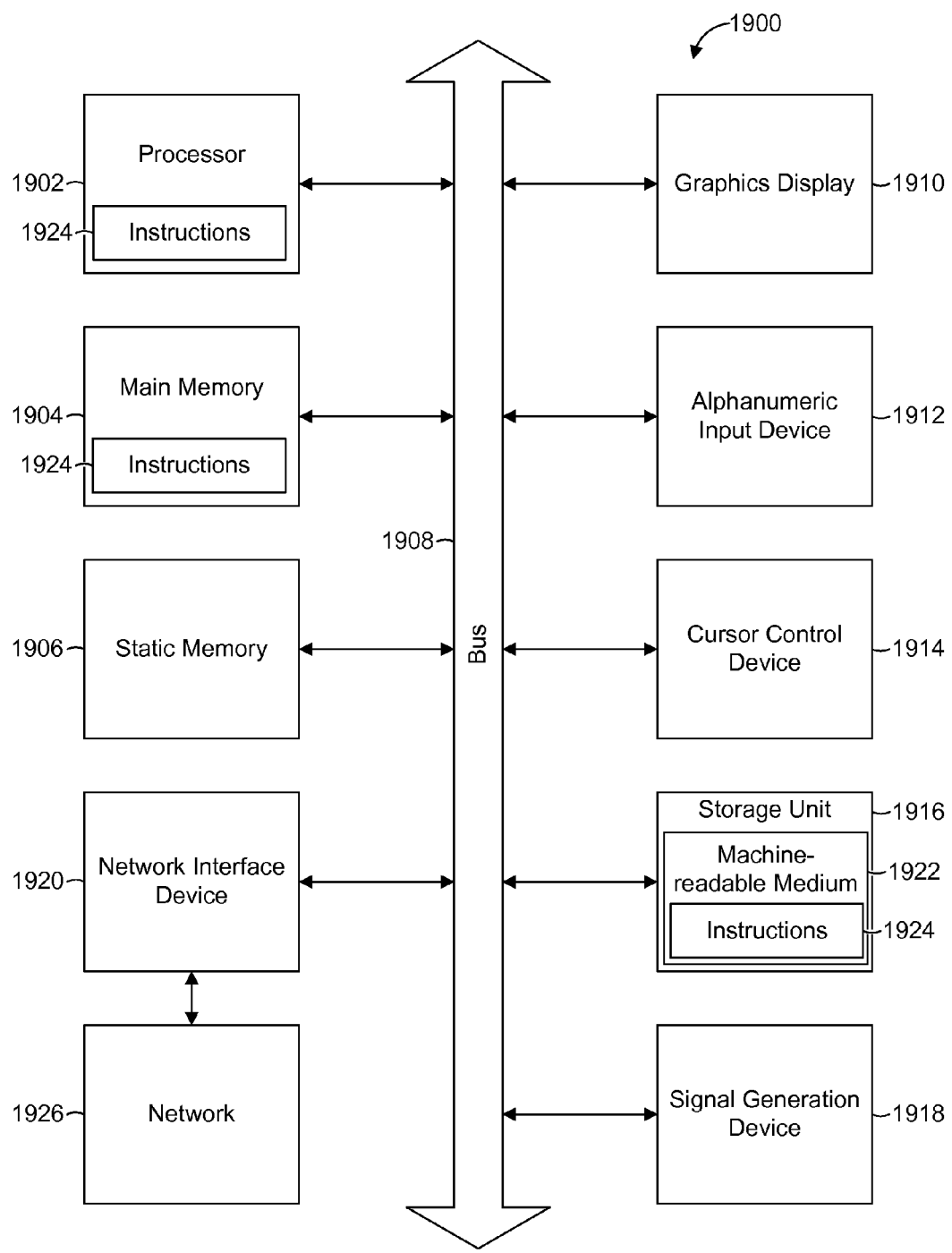
FIG. 19 is a block diagram illustrating components of a machine able to read instructions from a machine-readable medium and perform any one or more of the methodologies discussed herein, according to some example embodiments.

FIG. 19 is a block diagram illustrating components of a machine 1900 able to read instructions from a machine-readable medium (e.g., a machine-readable storage medium, a computer-readable storage medium, or any suitable combination thereof) and perform any one or more of the methodologies discussed herein, according to some example embodiments. Specifically, FIG. 19 shows a diagrammatic representation of the machine 1900 in the example form of a computer system and within which instructions 1924 (e.g., software, a program, an application, an applet, an app, or other executable code) for causing the machine 1900 to perform any one or more of the methodologies discussed herein may be executed, in whole or in part. In alternative embodiments, the machine 1900 operates as a standalone device or may be connected (e.g., networked) to other machines. In a networked deployment, the machine 1900 may operate in the capacity of a server machine or a client machine in a server-client network environment, or as a peer machine in a distributed (e.g., peer-to-peer) network environment. The machine 1900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1924, sequentially or otherwise, that specify actions to be taken by that machine 1900. Further, while only a single machine is illustrated, the term "machine" shall also be taken to include a collection of machines that individually or jointly execute the instructions 1924 to perform all or part of any one or more of the methodologies discussed herein.

The machine 1900 includes a processor 1902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1904, and a static memory 1906, which are configured to communicate with each other via a bus 1908. The machine 1900 may further include a graphics display 1910 (e.g., a plasma display panel (PDP), a light emitting diode (LED) display, a liquid crystal display (LCD), a projector, or a cathode ray tube (CRT)). The machine 1900 may also include an firstnumeric input device 1912 (e.g., a keyboard), a cursor control device 1914 (e.g., a mouse, a touchpad, a trackball, a joystick, a motion sensor, or other pointing instrument), a storage unit 1916, a signal generation device 1918 (e.g., a speaker), and a network interface device 1920.

The storage unit 1916 includes a machine-readable medium 1922 on which is stored the instructions 1924 embodying any one or more of the methodologies or functions described herein. The instructions 1924 may also reside, completely or at least partially, within the main memory 1904, within the processor 1902 (e.g., within the processor's cache memory), or both, during execution thereof by the machine 1900. Accordingly, the main memory 1904 and the processor 1902 may be considered as machine-readable media. The instructions 1924 may be transmitted or received over a network 1926 (e.g., network 190) via the network interface device 1920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1922 is shown in an example embodiment to be a single medium, the term "machine-readable medium" should be taken to include a single medium or multiple media (e.g., a centralized or distributed database, or associated caches and servers) able to store instructions (e.g., 1924). The term "machine-readable medium" shall also be taken to include any medium, or combination of multiple media, that is capable of storing instructions (e.g., 1924) for execution by a machine (e.g., machine 1900), such that the instructions (e.g., 1924), when executed by one or more processors of the machine (e.g., processor 1902), cause the machine 1900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may, accordingly, configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media, and systems (e.g., apparatus) discussed herein:

1. A method comprising:
    configuring a database system to operate in a first mode that processes first requests in a primary database and replicates results of the first requests as first replicated data in a secondary database, the first requests originating from an application, the primary database and the secondary database conforming to an unmodified requirement of an unmodified version of the application;
    creating secondary shadow data in the secondary database by copying the first replicated data within the secondary database;
    modifying the secondary database to conform to a modified requirement of a modified version of the application;
    creating primary shadow data in the primary database that conforms to the modified requirement of the modified version of the application; and
    configuring the database system to operate in a second mode that:
        processes second requests in the primary database and replicates results of the second requests in the secondary shadow data, the second requests originating from the application, the primary database and the secondary shadow data conforming to the unmodified requirement of the unmodified version of the application; and
        processes third requests in the secondary database and replicates results of the third requests in the primary shadow data, the third requests originating from the modified version of the application, the secondary database and the primary shadow data conforming to the modified requirements of the modified version of the application.

2. The method of description 1, wherein:
    the configuring of the database system to operate in the first mode includes configuring a dispatcher to dispatch requests from the unmodified version of the application to the primary database; and
    the configuring of the database system to operate in the second mode includes configuring the dispatcher to dispatch requests from the modified version of the application to the secondary database.

3. The method of either of descriptions 1 or 2, wherein:
    the primary database uses a first structure for data that conforms to the unmodified requirement of the unmodified version of the application;

the secondary database uses a modified first structure for data that conforms to the modified requirement of the unmodified version of the application;

the primary database uses a second structure for data that conforms to the unmodified requirement of the unmodified version of the application;

the secondary database uses the second structure for data that conforms to the unmodified requirement of the unmodified version of the application;

and the method further comprises:

configuring the database system to operate in a third mode that:

prevents modification of data stored in, the first structure for data that conforms to the unmodified requirement of the unmodified version of the application; and processes fourth requests in the primary database and replicates results of the fourth requests in the secondary shadow data, the fourth requests originating from the application, the primary database and the secondary shadow data conforming to the unmodified requirement of the unmodified version of the application.

4. The method of any of descriptions 1-3, further comprising:

after creating the secondary shadow data, configuring the database system to operate in a fourth mode that processes fifth requests in the primary database and ceases replicating results of the fifth requests in the secondary database, the fifth requests originating from the application.

5. The method of description 4, further comprising:

with the database system operating in the fourth mode, tracking the results of the fifth requests in tracked data; and with the database system operating in the second mode, replicating the tracked data in the secondary shadow data.

6. The method of any of descriptions 1-5, further comprising:

modifying the primary database to conform to the modified requirements of the modified version of the application; and configuring the database system to operate in a fifth mode that:

rejects requests from the application; and processes sixth requests in the secondary database and replicates results of the sixth requests in the primary database, the sixth requests originating from the modified version of the application, the primary database and the secondary database conforming to the modified requirement of the modified version of the application.

7. The method of any of descriptions 1-6, further comprising:

with the database system in the second mode, restoring the secondary database to conform to the unmodified requirement of the unmodified version of the application; and after restoring the secondary database:

deleting the secondary shadow data; and configuring the database system to operate in the first mode that processes seventh requests in the primary database and replicates results of the seventh requests in the secondary database, the seventh requests originating from the application, the primary database and the secondary database conforming to the unmodified requirement of the unmodified version of the application.

8. A system comprising:

a database system including a primary database and a secondary database;

a configuration module configured to configure the database system to operate in a first mode that processes first requests in the primary database and replicates results of the first requests as first replicated data in the secondary database, the first requests originating from an application, the primary database and the secondary database conforming to an unmodified requirement of an unmodified version of the application;

an upgrade module configured to:

create secondary shadow data in the secondary database by copying the first replicated data within the secondary database; and modify the secondary database to conform to a modified requirement of a modified version of the application;

create primary shadow data in the primary database that conforms to the modified requirement of the modified version of the application; and wherein the configuration module is further configured to configure the database system to operate in a second mode that:

processes second requests in the primary database and replicates results of the second requests in the secondary shadow data, the second requests originating from the application, the primary database and the secondary shadow data conforming to the unmodified requirement of the unmodified version of the application; and processes third requests in the secondary database and replicates results of the third requests in the primary shadow data, the third requests originating from the modified version of the application, the secondary database and the primary shadow data conforming to the modified requirement of the modified version of the application, the configuring of the database system to operate in the second mode being performed by a processor of a machine.

9. The system of description 8, further comprising:

a dispatcher module configured to:

while the database system operates in the first mode, dispatch requests from the unmodified version of the application to the primary database; and while the database system operates in the second mode, dispatch requests from the modified version of the application to the secondary database.

10. The system of either of descriptions 8 or 9, wherein:

the primary database uses a first structure for data that conforms to the unmodified requirement of the unmodified version of the database;

the secondary database uses a modified first structure for data that conforms to the modified requirement of the unmodified version of the database;

the primary database uses a second structure for data that conforms to the unmodified requirement of the unmodified version of the database;

the secondary database uses the second structure for data that conforms to the unmodified requirement of the unmodified version of the database; and the configuration module is further configured to configure the database system to operate in a third mode that:

prevents modification of data stored in the first structure for data that conforms to the unmodified requirement of the unmodified version of the database; and processes fourth requests in the primary database and replicates results of the fourth requests in the secondary shadow data, the fourth requests originating from the application, the primary database and the secondary shadow data conforming to the unmodified requirement of the unmodified version of the application.

11. The system of any of descriptions 8-10, wherein:
the configuration module is further configured to:
configure the database system to operate in a fourth mode that processes fifth requests in the primary database and avoids replicating results of the fifth requests in the secondary database, the fifth requests originating from the application.

12. The system of description 11, wherein:
the database system is further configured to:
while operating in the fourth mode, track the results of the first requests in tracked data; and
after beginning operation in the second mode, replicating the tracked data in the secondary shadow data.

13. The system of any of descriptions 8-12, wherein:
the upgrade module is further configured to modify the primary database to conform to the modified requirement of the modified version of the application; and
the configuration module is further configured to configure the database system to operate in a fifth mode that:
rejects requests from the application; and
processes sixth requests in the secondary database and replicates results of the sixth requests in the primary database, the sixth requests originating from the modified version of the application, the primary database and the secondary database conforming to the modified requirement of the modified version of the application.

14. The system of any of descriptions 8-13, further comprising:
a downgrade module configured to:
with the database system operating in the second mode, restore the secondary database to conform to the unmodified requirement of the unmodified version of the application; and
after restoring the secondary database:
delete the secondary shadow data; and
cause the configuration module to configure the database system to operate in the first mode that processes seventh requests in the primary database and replicates results of the seventh requests in the secondary database, the seventh requests originating from the application, the primary database and the secondary database conforming to the unmodified requirement of the unmodified version of the application.

15. A non-transitory machine-readable storage medium comprising instructions that, when executed by one or more processors of a machine, cause the machine to perform operations comprising:
configuring a database system to operate in a first mode that processes first requests in a primary database and replicates results of the first requests as first replicated data in a secondary database, the first requests originating from an application, the primary database and the secondary database conforming to an unmodified requirement of an unmodified version of the application;

creating secondary shadow data in the secondary database by copying the first replicated data within the secondary database;
modifying the secondary database to conform to a modified requirement of a modified version of the application;
creating primary shadow data in the primary database that conforms to the modified requirement of the modified version of the application; and
configuring the database system to operate in a second mode that:
processes second requests in the primary database and replicates results of the second requests in the secondary shadow data, the second requests originating from the application, the primary database and the secondary shadow data conforming to the unmodified requirement of the unmodified version of the application; and
processes third requests in the secondary database and replicates results of the third requests in the primary shadow data, the third requests originating from the modified version of the application, the secondary database and the primary shadow data conforming to the modified requirements of the modified version of the application.

16. The non-transitory machine-readable storage medium of description 15, wherein:
the configuring of the database system to operate in the first mode includes configuring a dispatcher to dispatch requests from the unmodified version of the application to the primary database; and
the configuring of the database system to operate in the second mode includes configuring the dispatcher to dispatch requests from the modified version of the application to the secondary database.

17. The non-transitory machine-readable storage medium of either of descriptions 15 or 16, wherein:
the primary database uses a first structure for data that conforms to the unmodified requirement of the unmodified version of the database;
the secondary database uses a modified first structure for data that conforms to the modified requirement of the unmodified version of the database;
the primary database uses a second structure for data that conforms to the unmodified requirement of the unmodified version of the database;
the secondary database uses the second structure for data that conforms to the unmodified requirement of the unmodified version of the database;
and the operations further comprise:
configuring the database system to operate in a third mode that:
prevents modification of data stored the first structure for data that conforms to the unmodified requirement of the unmodified version of the database; and
processes fourth requests in the primary database and replicates results of the fourth requests in the secondary shadow data, the fourth requests originating from the application, the primary database and the secondary shadow data conforming to the unmodified requirement of the unmodified version of the application.

18. The non-transitory machine-readable storage medium of any of descriptions 15-17, wherein the operations further comprise:
after creating the secondary shadow data, configuring the database system to operate in a fourth mode that processes fifth requests in the primary database and ceases replicating results of the fifth requests in the secondary database, the fifth requests originating from the application.

19. The non-transitory machine-readable storage medium of description 18, wherein the operations further comprise:
with the database system operating in the fourth mode, tracking the results of the fifth requests in tracked data; and
with the database system operating in the second mode, replicating the tracked data in the secondary shadow data.

20. The non-transitory machine-readable storage medium of any of descriptions 15-19, wherein the operations further comprise:
modifying the primary database to conform to the modified requirements of the modified version of the application; and
configuring the database system to operate in a fifth mode that:
rejects requests from the application; and
processes sixth requests in the secondary database and replicates results of the sixth requests in the primary database, the sixth requests originating from the modified version of the application, the primary database and the secondary database conforming to the modified requirement of the modified version of the application.

What is claimed is:

1. A method comprising:
configuring a database system to operate in a first mode that processes first requests in a primary database and replicates results of the first requests as first replicated data in a secondary database, the first requests originating from an application, the primary database and the secondary database conforming to an unmodified requirement of an unmodified version of the application;
creating secondary shadow data in the secondary database by copying the first replicated data within the secondary database;
modifying the secondary database to conform to a modified requirement of a modified version of the application;
creating primary shadow data in the primary database that conforms to the modified requirement of the modified version of the application; and
configuring the database system to operate in a second mode that:
processes second requests in the primary database and replicates results of the second requests in the secondary shadow data, the second requests originating from the application, the primary database and the secondary shadow data conforming to the unmodified requirement of the unmodified version of the application; and
processes third requests in the secondary database and replicates results of the third requests in the primary shadow data, the third requests originating from the modified version of the application, the secondary database and the primary shadow data conforming to the modified requirements of the modified version of the application,
the configuring of the database system to operate in the second mode being performed by a processor of a machine.

2. The method of claim 1, wherein:
the configuring of the database system to operate in the first mode includes configuring a dispatcher to dispatch requests from the unmodified version of the application to the primary database; and
the configuring of the database system to operate in the second mode includes configuring the dispatcher to dispatch requests from the modified version of the application to the secondary database.

3. The method of claim 1, wherein:
the primary database uses a first structure for data that conforms to the unmodified requirement of the unmodified version of the application;
the secondary database uses a modified first structure for data that conforms to the modified requirement of the unmodified version of the application;
the primary database uses a second structure for data that conforms to the unmodified requirement of the unmodified version of the application;
the secondary database uses the second structure for data that conforms to the unmodified requirement of the unmodified version of the application;
and the method further comprises:
configuring the database system to operate in a third mode that:
prevents modification of data stored in the first structure for data that conforms to the unmodified requirement of the unmodified version of the application; and
processes fourth requests in the primary database and replicates results of the fourth requests in the secondary shadow data, the fourth requests originating from the application, the primary database and the secondary shadow data conforming to the unmodified requirement of the unmodified version of the application.

4. The method of claim 1, further comprising:
after creating the secondary shadow data, configuring the database system to operate in a fourth mode that processes fifth requests in the primary database and ceases replicating results of the fifth requests in the secondary database, the fifth requests originating from the application.

5. The method of claim 4, further comprising:
with the database system operating in the fourth mode, tracking the results of the fifth requests in tracked data; and
with the database system operating in the second mode, replicating the tracked data in the secondary shadow data.

6. The method of claim 1, further comprising:
modifying the primary database to conform to the modified requirements of the modified version of the application; and
configuring the database system to operate in a fifth mode that:
rejects requests from the application; and
processes sixth requests in the secondary database and replicates results of the sixth requests in the primary database, the sixth requests originating from the modified version of the application, the primary database and the secondary database conforming to the modified requirement of the modified version of the application.

7. The method of claim 1, further comprising:
with the database system in the second mode, restoring the secondary database to conform to the unmodified requirement of the unmodified version of the application; and
after restoring the secondary database:
deleting the secondary shadow data; and
configuring the database system to operate in the first mode that processes seventh requests in the primary database and replicates results of the seventh requests in the secondary database, the seventh requests originating from the application, the primary database and the secondary database conforming to the unmodified requirement of the unmodified version of the application.

8. A system comprising:
a database system including a primary database and a secondary database;
a configuration module configured to configure the database system to operate in a first mode that processes first requests in the primary database and replicates results of the first requests as first replicated data in the secondary database, the first requests originating from an application, the primary database and the secondary database conforming to an unmodified requirement of an unmodified version of the application;
an upgrade module configured to:
create secondary shadow data in the secondary database by copying the first replicated data within the secondary database;
modify the secondary database to conform to a modified requirement of a modified version of the application;
create primary shadow data in the primary database that conforms to the modified requirement of the modified version of the application; and wherein
the configuration module is further configured to configure the database system to operate in a second mode that:
processes second requests in the primary database and replicates results of the second requests in the secondary shadow data, the second requests originating from the application, the primary database and the secondary shadow data conforming to the unmodified requirement of the unmodified version of the application; and
processes third requests in the secondary database and replicates results of the third requests in the primary shadow data, the third requests originating from the modified version of the application, the secondary database and the primary shadow data conforming to the modified requirement of the modified version of the application,
the configuring of the database system to operate in the second mode being performed by a processor of a machine.

9. The system of claim 8, further comprising:
a dispatcher module configured to:
while the database system operates in the first mode, dispatch requests from the unmodified version of the application to the primary database; and
while the database system operates in the second mode, dispatch requests from the modified version of the application to the secondary database.

10. The system of claim 8, wherein:
the primary database uses a first structure for data that conforms to the unmodified requirement of the unmodified version of the application;
the secondary database uses a modified first structure for data that conforms to the modified requirement of the unmodified version of the application;
the primary database uses a second structure for data that conforms to the unmodified requirement of the unmodified version of the application;
the secondary database uses the second structure for data that conforms to the unmodified requirement of the unmodified version of the application; and
the configuration module is further configured to configure the database system to operate in a third mode that:
prevents modification of data stored in the first structure for data that conforms to the unmodified requirement of the unmodified version of the application; and
processes fourth requests in the primary database and replicates results of the fourth requests in the secondary shadow data, the fourth requests originating from the application, the primary database and the secondary shadow data conforming to the unmodified requirement of the unmodified version of the application.

11. The system of claim 8, wherein:
the configuration module is further configured to:
configure the database system to operate in a fourth mode that processes fifth requests in the primary database and avoids replicating results of the fifth requests in the secondary database, the fifth requests originating from the application.

12. The system of claim 11, wherein:
the database system is further configured to:
while operating in the fourth mode, track the results of the first requests in tracked data; and
after beginning operation in the second mode, replicate the tracked data in the secondary shadow data.

13. The system of claim 8, wherein:
the upgrade module is further configured to modify the primary database to conform to the modified requirement of the modified version of the application; and
the configuration module is further configured to configure the database system to operate in a fifth mode that:
rejects requests from the application; and
processes sixth requests in the secondary database and replicates results of the sixth requests in the primary database, the sixth requests originating from the modified version of the application, the primary database and the secondary database conforming to the modified requirement of the modified version of the application.

14. The system of claim 8, further comprising:
a downgrade module configured to:
with the database system operating in the second mode, restore the secondary database to conform to the unmodified requirement of the unmodified version of the application; and
after restoring the secondary database:
delete the secondary shadow data; and
cause the configuration module to configure the database system to operate in the first mode that processes seventh requests in the primary database and replicates results of the seventh requests in the secondary database, the seventh requests originating from the application, the primary database and the secondary database conforming to the unmodified requirement of the unmodified version of the application.

15. A non-transitory machine-readable storage medium comprising instructions that, when executed by one or more processors of a machine, cause the machine to perform operations comprising:
- configuring a database system to operate in a first mode that processes first requests in a primary database and replicates results of the first requests as first replicated data in a secondary database, the first requests originating from an application, the primary database and the secondary database conforming to an unmodified requirement of an unmodified version of the application;
- creating secondary shadow data in the secondary database by copying the first replicated data within the secondary database;
- modifying the secondary database to conform to a modified requirement of a modified version of the application;
- creating primary shadow data in the primary database that conforms to the modified requirement of the modified version of the application; and
- configuring the database system to operate in a second mode that:
  - processes second requests in the primary database and replicates results of the second requests in the secondary shadow data, the second requests originating from the application, the primary database and the secondary shadow data conforming to the unmodified requirement of the unmodified version of the application; and
  - processes third requests in the secondary database and replicates results of the third requests in the primary shadow data, the third requests originating from the modified version of the application, the secondary database and the primary shadow data conforming to the modified requirements of the modified version of the application.

16. The non-transitory machine-readable storage medium of claim 15, wherein:
- the configuring of the database system to operate in the first mode includes configuring a dispatcher to dispatch requests from the unmodified version of the application to the primary database; and
- the configuring of the database system to operate in the second mode includes configuring the dispatcher to dispatch requests from the modified version of the application to the secondary database.

17. The non-transitory machine-readable storage medium of claim 15, wherein:
- the primary database uses a first structure for data that conforms to the unmodified requirement of the unmodified version of the database;
- the secondary database uses a modified first structure for data that conforms to the modified requirement of the unmodified version of the database;
- the primary database uses a second structure for data that conforms to the unmodified requirement of the unmodified version of the database;
- the secondary database uses the second structure for data that conforms to the unmodified requirement of the unmodified version of the database;
- and the operations further comprise:
- configuring the database system to operate in a third mode that:
  - prevents modification of data stored in the first structure for data that conforms to the unmodified requirement of the unmodified version of the database; and
  - processes fourth requests in the primary database and replicates results of the fourth requests in the secondary shadow data, the fourth requests originating from the application, the primary database and the secondary shadow data conforming to the unmodified requirement of the unmodified version of the application.

18. The non-transitory machine-readable storage medium of claim 15, wherein the operations further comprise:
- after creating the secondary shadow data, configuring the database system to operate in a fourth mode that processes fifth requests in the primary database and ceases replicating results of the fifth requests in the secondary database, the fifth requests originating from the application.

19. The non-transitory machine-readable storage medium of claim 18, wherein the operations further comprise:
- with the database system operating in the fourth mode, tracking the results of the fifth requests in tracked data; and
- with the database system operating in the second mode, replicating the tracked data in the secondary shadow data.

20. The non-transitory machine-readable storage medium of claim 15, wherein the operations further comprise:
- modifying the primary database to conform to the modified requirements of the modified version of the application; and
- configuring the database system to operate in a fifth mode that:
  - rejects requests from the application; and
  - processes sixth requests in the secondary database and replicates results of the sixth requests in the primary database, the sixth requests originating from the modified version of the application, the primary database and the secondary database conforming to the modified requirement of the modified version of the application.

* * * * *